(12) United States Patent
Ta et al.

(10) Patent No.: US 7,299,171 B2
(45) Date of Patent: Nov. 20, 2007

(54) METHOD AND SYSTEM FOR PROCESSING GRAMMAR-BASED LEGALITY EXPRESSIONS

(75) Inventors: Thanh Ta, Huntington Beach, CA (US); Eddie Chen, Rancho Palos Verdes, CA (US); Guillermo Lao, Torrance, CA (US); Edgardo Valenzuela, South Gate, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 148 days.

(21) Appl. No.: 10/919,438

(22) Filed: Aug. 17, 2004

(65) Prior Publication Data

US 2006/0041421 A1      Feb. 23, 2006

(51) Int. Cl.
*G06F 17/21* (2006.01)
(52) U.S. Cl. .......................................... 704/9
(58) Field of Classification Search ............... 704/10, 704/4, 1, 9
See application file for complete search history.

(56) References Cited

U.S. PATENT DOCUMENTS

| | | | | |
|---|---|---|---|---|
| 5,629,980 A | * | 5/1997 | Stefik et al. ............... | 705/54 |
| 5,940,504 A | * | 8/1999 | Griswold ..................... | 705/32 |
| 6,138,119 A | * | 10/2000 | Hall et al. ..................... | 707/4 |
| 6,405,199 B1 | * | 6/2002 | Carter et al. .................. | 707/6 |
| 2004/0049462 A1 | * | 3/2004 | Wang ........................... | 705/50 |
| 2004/0267552 A1 | * | 12/2004 | Gilliam et al. ................ | 705/1 |

FOREIGN PATENT DOCUMENTS

WO     WO 3094076 A1  *  11/2003

* cited by examiner

*Primary Examiner*—Tālivaldis Ivars Šmits
*Assistant Examiner*—Thomas E. Shortledge
(74) *Attorney, Agent, or Firm*—Marc S. Kaufman; Carlos Villamar; Nixon Peabody LLP

(57) ABSTRACT

Legality expressions are systematically pre-processed, organized, and stored to achieve faster real-time response, improved predictability, and increased reliability for queries against a large volume of legality expressions. Exponential improvements in both the time to locate the set of legality expressions matching specified search criteria and the processing costs of evaluating the request against the matching legality expressions are achieved using the disclosed systems, devices, and methods. The systems, devices, and methods are unique to the optimization of legality expression processing, but they can also enable the use of other optimization techniques for processing large amounts of data.

103 Claims, 12 Drawing Sheets

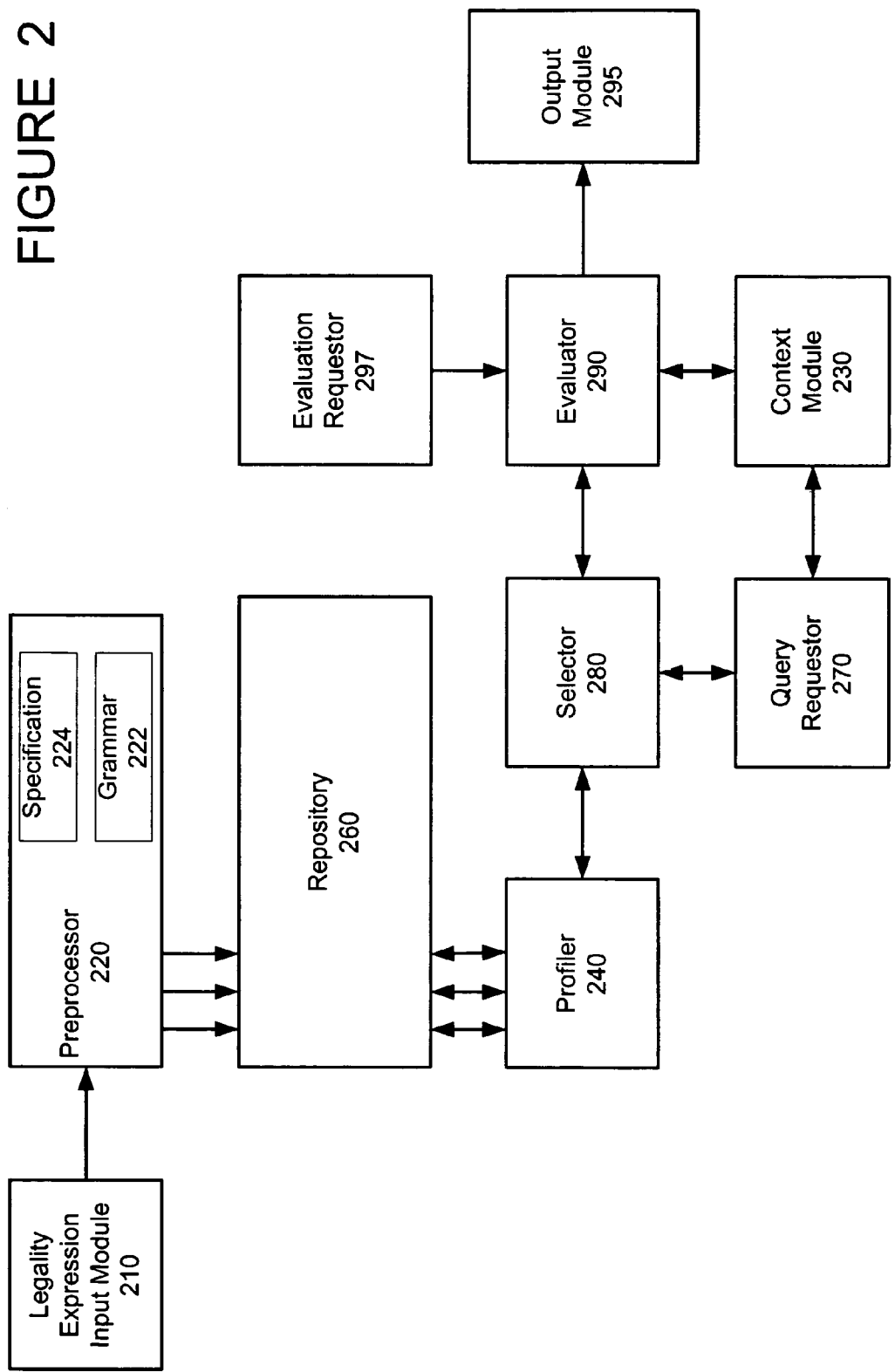

License 1

[g1] Grant
[p1]    Principal
            keyHolder
                KeyValue
                    Any DSAKeyValue

[a1]    Rights: play
[r1]    Resource: Chopin, Noctune in A minor

[G]     GrantGroup
[p2]    Principal
            keyHolder
                KeyValue
                    DSAKeyValue
                        p1
                        q1
                        y1

[g2]    Grant
[a2]        Rights: play
[r2]        Resource: Beethoven,AnySymphony

[g3]    Grant
[a3]        Rights: copy
[r3]        Resource: Beethoven,AnySymphony
[c3]        Condition: Exercise limit, count = 2

FIGURE 9A

METHOD AND SYSTEM FOR PROCESSING GRAMMAR-BASED LEGALITY EXPRESSIONS

FIELD OF THE INVENTION

The invention relates to the field of processing grammar-based legality expressions. More particularly, it relates to systems and methods that optimize processing of legality expressions, enabling legality expression processing systems to respond to requests expeditiously and within a predicable time frame.

BACKGROUND OF THE INVENTION

Declarative Meta languages have been promoted heavily in the information technology industry since the early 1990s by industry leaders such as Microsoft, IBM, and Sun Microsystems. Since that time, an increasing number of systems and applications have adopted the use of Meta languages. One of the Meta languages, XML, has become the de facto standard.

One use for which Meta languages have been proposed is legality expressions. Legality expressions are syntactically and semantically correct constructs based on a defined grammar. Legality expressions are the manifestation of a legality statement in digital form. The semantics of legality expressions may include assertions, certifications, permissions, obligations, prohibitions, intentions, promises, exclusivities, declarations, rules, rights, conditions, and policies. Legality expression "semantics" refer to the meanings of the legality expression. The "syntax" of legality expressions is another key component and refers to the data types and the structure in which words or expressions are put together to form phrases or clauses.

By themselves, Meta languages typically do not carry machine-interpretable semantics. However, there has been great industry demand for machine-interpretable semantics to automate business transactions and to facilitate interoperability across devices, platforms, and systems. Driven by this demand, enterprises and industry standard groups have developed legality expression grammars to overlay a Meta language. These grammars capture the semantics of legal expressions. Analogous to the relationship between a clause and the grammar in a natural language, a legality expression is a specific clause based on and compliant with the legality expression grammar.

Examples of legality expression grammars include, but are not limited to, the eXtensible rights Markup Language (XrML), the ISO MPEG Rights Expression Language (MPEG REL), the Open Digital Rights Language (ODRL), the Open Mobile Alliance (OMA) REL, the Content Reference Forum Contract Expression Language (CRF CEL), the Security Assertion Markup Language (SAML), the XML Access Control Language (XACL), the eXtensible Access Control Markup Language (XACML), the Business Process Execution Language (BPEL), and the Process Specification Language (PSL). Examples of legality expressions include XrML licenses that govern the use of Microsoft RMS-enabled Office documents, XML licenses that govern the use of Digital Rights Management (DRM) enabled Windows Media content, SAML assertions in Web Services applications, CEL-based eContracts for CRF-targeted business scenarios, and the like. This list of legality expression grammars is not inclusive, but instead shows examples of legality expression grammars well known in the industry.

Legality expressions may be used in a wide variety of systems and applications. Some examples include agreements between business entities, permissions granted by rights holders to distributors and consumers, policies and rules governing computer system behaviors, digital identification, digital certificates, tokens that assert an entity's identity and attributes, tokens that assert an entity's privileges in a government or enterprise security environment, and the like.

The primary objectives of legality expressions are to facilitate human-to-machine and machine-to-machine communications, and to enable precise and unambiguous machine interpretation. In other words, the syntax and semantics of legality expression grammars are typically not designed for an optimal real-time processing response. Transformation of the original legality expression format into a machine-internal representation is often required to detect the intent of a user from the semantics (meaning) and syntax (arrangement) of the legality expression.

In addition, it is conventional to impose digital signatures on legality expressions to authenticate their integrity. For privacy protection, legality expressions may be further protected by cryptographic means such as encryption. To mitigate size, bandwidth, and other constraints, legality expressions may be encoded in different formats. For example, a legality expression may be encoded in a binary format to reduce its size in the mobile communication environment. The transformation, digital signature, security protection, encoding, and other potential formatting all introduce additional overhead to the processing of legality expressions.

As grammar-based legality expressions become the prevalent means for communicating and enforcing legality terms on machine-interpreted and enforced transactions, many systems and applications may need to process large volumes of legality expressions efficiently. For example, a consumer's personal computer may contain thousands of licenses, each of which governs the use of one specific digital work or a group of digital works. In another example, a rights clearance center may manage and process millions of electronic licenses and contracts in response to frequent queries. In a third example, a large retailer may implement an automated contract issuance and management system that stores the contractual agreements between itself and its hundreds or thousands of suppliers expressed in a CEL. This application would require a gigantic database of eContracts. In addition, there are many instances where a legality expression management system needs to satisfy a fixed response-time requirement. For example, it may need to deliver authorization tokens for viewing a streaming video to the consumption device every second. A lengthy search for the appropriate permissions and usage rights would not be a practical solution in this environment.

In a conventional legality expression processing system, legality expressions are stored sequentially in a persistent repository. The stored legality expressions are captured in the original Meta language syntax. In certain cases, the legality expressions may be binary encoded, digitally signed, security protected, and formatted by other means.

Triggered by a processing request, the system processes the legality expressions in a linear fashion, typically going through the following steps of first selecting the legality expressions relevant to the processing request. The processing request typically encompasses a specific context. For example, a request might impose the query, "Does music distributor X have the permission from record company Y to sell its content in territory Z?" In this case, "X", "Y", "Z", and "sell" can all be used as filters to select the relevant legality expressions. In other words, this specific processing request is only interested in the legality expressions that satisfy these four filtering criteria. Depending on the type of processing request, the system may need to find the first legality expression that matches the query, a subset of legality expressions that match the query, or all legality expressions that match the query.

Second, the legality expression is validated. The set of matching legality expressions from the "Select" step must be validated and verified. This may include reversing the binary encoding process, decrypting, verifying digital signature to confirm integrity, and validating the syntax of the legality expressions against the grammar.

Third, the legality expression is interpreted. This step extracts the semantic meaning from the legality expressions to construct the information needed for a response to the processing request. This step may also involve retrieving and processing other related legality expressions needed for the response. For examples, a usage right may only be granted if the principal possesses another (prerequisite) right. A legality expression can have one or more other rights or legal obligations requiring interpreting many layers of authorization, authentication, and the like. In this case, the system must search for and verify that the principal does possess the required pre-requisite right before granting the usage right.

Last, the system responds to the processing request. Once the initial steps have been completed, the system must determine that all conditions and obligations are satisfied in order to properly respond to the processing request.

These operations can be computing-resource and processing intensive, especially when the legality expressions are complicated, lengthy, or dependant on other legality expressions. Without a systematic method to organize and manage high volumes of legality expressions, it will be very difficult, and in some instances impossible, to respond to query, event, authorization, or other processing requests within a reasonable time. If the legality expressions are stored sequentially in a conventional storage area, looking up the legality expressions via linear or binary search, and the subsequent processing, may result in a wide range of indeterminate response times, making it impossible to meet fixed response time requirements. Conventional processing of legality expressions is not practical nor efficient in a system managing thousands or millions of legality expressions.

What is needed is a new type of system and method of efficiently processing legality expressions to meet communication requests expeditiously and in a predictable time frame.

SUMMARY OF THE INVENTION

The present invention relates to a system and method for efficiently storing and cataloging legality expressions to provide exceptional retrieval speed and integrity. The present invention provides a simple, powerful, and elegant manner in which legality expressions that match the context may be quickly retrieved and processing costs of evaluating a processing request may be reduced.

The present invention provides a systematic method to pre-process, organize, and store legality expressions that achieves faster real-time response, improved predictability, and increased reliability for queries against a large volume of legality expressions. This invention improves both the time to locate the set of legality expressions matching the provided context and the processing costs of evaluating the request against the matching legality expressions.

Additionally, the present invention introduces systems, devices, and methods unique to the optimization of legality expression storage and organization to facilitate the use of additional optimization techniques for processing large amounts of data. These techniques include, but are not limited to, caching the results of frequently-used queries, indexing the data for optimal search performance, storing and organizing the data in databases, distributing the processing and computing tasks to multiple processors, and predicting the queries based on user behaviors and histograms. The storage and organization optimization methods performed by the present invention are the pre-requisites that enable the use of further optimization techniques illustrated above.

BRIEF DESCRIPTION OF THE DRAWINGS

The above-mentioned and other features of this invention and the manner of attaining them will become more apparent, and the invention itself will be better understood, by reference to the following description of embodiments of the invention taken in conjunction with the accompanying figures where:

FIG. 2 illustrates a block diagram of the components of an exemplary system to process legality expressions in a method in accordance with the present invention.

FIG. 9A illustrates an example of a pseudo MPEG REL license.

DETAILED DESCRIPTION OF THE INVENTION

The invention is described in detail with particular reference to certain preferred embodiments, but within the spirit and scope of the invention, it is not limited to such embodiments. It will be apparent to those of skill in the art that various features, variations, and modifications can be included or excluded, within the limits defined by the claims and the requirements of a particular use.

The present invention extends the functionality of current methods and systems used to process legality expressions by properly and consistently pre-processing, organizing, and storing legality expressions to achieve increased efficiency, predictability, and speed. The system and method of the present invention has many advantages over prior systems, because the legality expressions and their elemental structures provided by the present invention significantly reduce the locating times and processing costs required while providing improved consistency and reliability in optimizing retrieval methods.

The present invention reduces processing costs during evaluation and efficiently stores legality expressions so that they can be retrieved quickly based on given search criteria. The present invention improves both the time to locate the set of legality expressions that match the search criteria and the processing costs of evaluating the request against the matching set of results.

The present invention discloses an evaluation model that optimizes the structure of legality expressions for storage, retrieval, and evaluation. The system of the present invention is built on the disclosed evaluation model to pre-process legality expressions. An assessment of the performance improvements that this invention offers is further described, and the structure of an example rights database for an embodiment that supports XrML is disclosed.

1. Evaluation Model

The disclosed evaluation model describes an optimized structure for legality expressions, an optimized mechanism to profile expressions, and an optimized unification method for storage, retrieval, and evaluation of legality expressions.

Figure 9B:
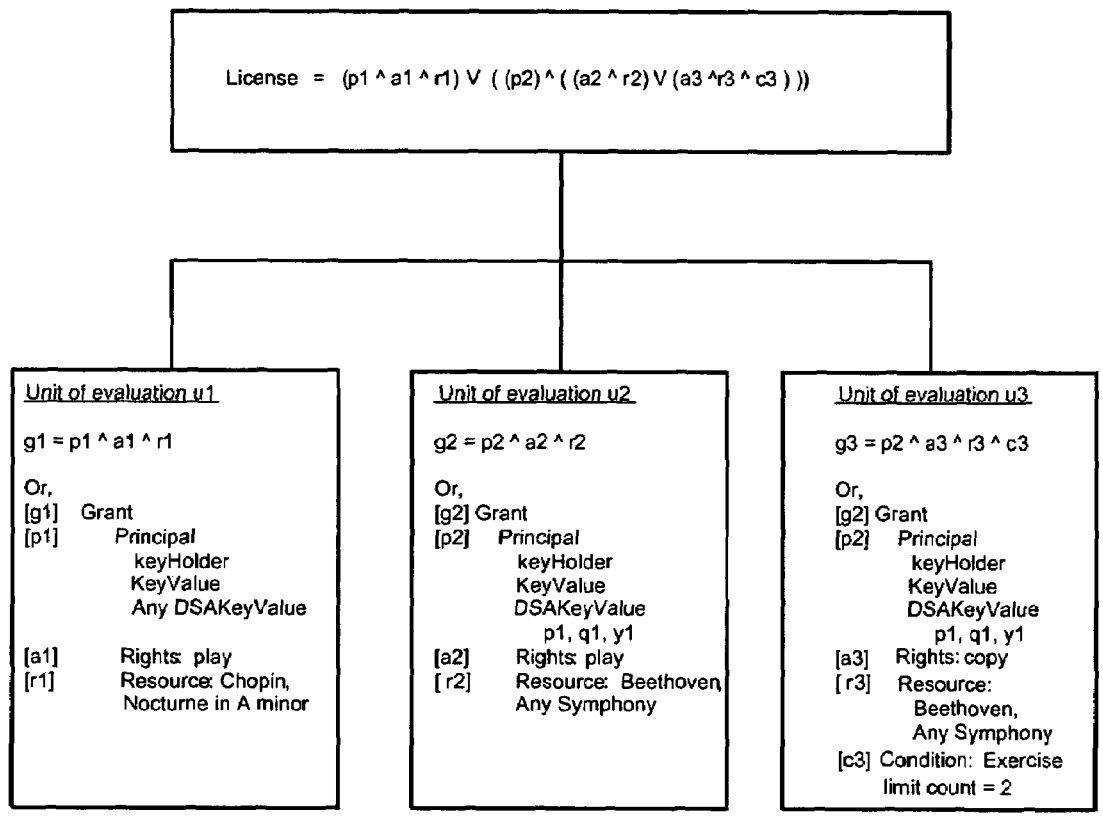
FIG. 9B illustrates an example of units of evaluation that comprise an MPEG REL license.

Legality expressions may be equated to specific clauses based upon a particular grammar. The optimized structure for machine processing of legality expressions in the disclosed evaluation model is called a unit of evaluation. A unit of evaluation represents a lowest level statement that can be evaluated and thereby result in a decision, such as an authorization or an authentication decision. FIG. 9A illustrates a legality expression using a MPEG REL pseudo license as the example. Pseudo license is not strictly conforming to the MPEG REL syntax. It expresses the key MPEG REL semantics in a simplified form. Section [A.1] in the Appendix describes the structure of the example pseudo license and how it is represented according to the evaluation model. FIG. 9B illustrates units of evaluation based on the example pseudo license illustrated in FIG. 9A. Also section [A.2] in the Appendix describes the optimization method to partition the example pseudo license into units of evaluation.

Units of evaluation may be further broken down into their constituent parts called "atomic expressions," denoting the most basic building block of a unit of evaluation. Continuing from the FIG. 9B example, FIG. 9C identifies the atomic expressions within the units of expressions. Also section [A.3] in the Appendix describes the atomic expressions within each of the unit of evaluation.

Many legality expressions languages have their own optimized methods for representing the information stored in the expressions. For example, in the MPEG REL, grants with the same principal can be grouped together into a grant group so that the principal (i.e., right grantee) need not be declared repeatedly in each grant. Such optimization reduces the number of expressions needed to represent the required statements, but it is not the optimal way to store and retrieve the target statement for evaluation. The disclosed evaluation model therefore proposes an optimized structure to which all legality expressions can be transformed so that they can be efficiently stored and retrieved for evaluation.

The optimized mechanism to profile legality expressions in the disclosed evaluation model is a profile consisting of a set of related expressions that are syntactically different but semantically the same. That is, a set of expressions that all say the same thing but in a different way. The same statement is made in a different fashion. Use of a profile ensures the evaluation of legality expressions against a (query) context. The context contains all the facts from which an expression is evaluated. When the context is constructed from a query, it is often called a query context. The context is a set of expressions representing the facts relating to the request. Section [A.4] in the Appendix describes some examples of query contexts.

In the example shown below, a song context object can be identified by its title and by its unique ID assigned by the producer. All the different expressions that represent a specific song are called a profile. Thus, the retrieval of the expressions representing a specific song (query context object) is guaranteed to be complete if the search is performed over all expressions in the profile for that song.

Object: The specific musical composition of words and notes.

Expression 1: Beethoven, Ninth Symphony (Title)

Expression 2: Deutsche Grammophon Catalog #429861 (Record Label ID)

The profile function returns all the different expressions that represent the same object. In the above example, the profile function returns Expression 1 and Expression 2 as below:

Beethoven Ninth Symphony; Deutsche Grammophon Catalog #429861

The optimized unification method for legality expressions in the disclosed evaluation model evaluates whether a query context object, which is an expression (fact) specified in the context, can be used to substitute for a particular atomic expression. An example of the optimized unification method is illustrated below:

[1] Legality Expression: Any Beethoven Symphonies

[2] Expression In The Query Context: Beethoven, Ninth Symphony

Then expression [2] can be used to substitute for [1].

Another example of the unification is shown below when an expression may not be substituted:

[1] Legality Expression: Any Beethoven Symphonies

[2] Expression In The Query Context: Chopin, Nocturne In 'A' Minor

In this case, the query context object is not the proper context, and expression [2] cannot be used to substitute for [1].

The unification method evaluates an atomic expression against the context and resolves the conflict if one exists in the result from the evaluation. This method is also used in the retrieval of a set of legality expressions that match with the (query) context. Expressions that are retrieved using the disclosed unification method are matched with the (query) context, and therefore the returned expressions need not be evaluated.

a. Optimized Legality Expression Structure

As defined above, a legality expression is a specific clause based on, and in compliance with, a legality expression grammar. In grammar-based legality expression languages, the evaluation of the legality expressions against a request can be optimally carried out over a list of units of evaluation. For example, in MPEG REL, a unit of evaluation can be a grant specifying that a principal may exercise a right over a resource under certain conditions. Section [A.2] in the Appendix describes the units of evaluation of a pseudo MPEG REL license. In BPEL, a unit of evaluation can be an operation or business activity that can be invoked or performed.

In some applications (such as those using the MPEG REL, CRF CEL, or XACL), evaluating a unit of evaluation usually results in an authorization or authentication decision. In other applications (such as those using BPEL or PSL), evaluation of a unit of evaluation results in an activity or operation being carried out. For example, evaluation of an MPEG REL grant against a requested principal, right, and resource returns an authorization decision stipulating whether the input principal is allowed to exercise the input right over the input resource. Evaluating an XACL document against the input subject, content, and access results in an authorization decision stipulating whether the input subject is allowed to access the input content.

Figure 1A:
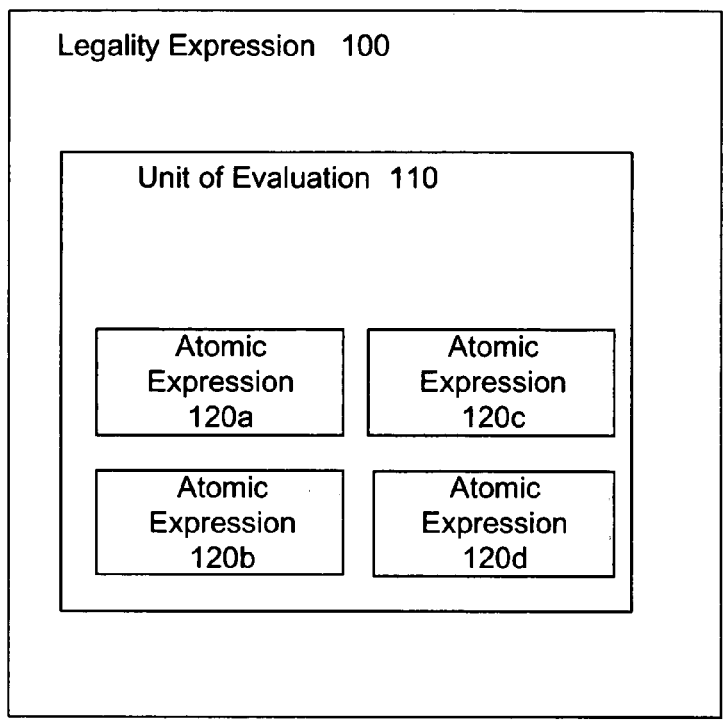
FIG. 1A illustrates a structural block diagram of a legality expression in accordance with the present invention.

Although the physical representation of a legality expression and a unit of evaluation are different among different applications, the structures of these components are similar in terms of evaluation. As shown in FIG. 1A, legality expression 100 comprises units of evaluation 110. Units of evaluation 110 are made up of atomic expressions 120*a*, 120*b*, 120*c*, 120*d*. Units of evaluation 110 are combinatorial expressions. Evaluation of a unit of evaluation 110 as a whole is a conjunction of the evaluation of all of the atomic expressions 120*a*, 120*b*, 120*c*, 120*d* that comprise it.

Figure 1B:
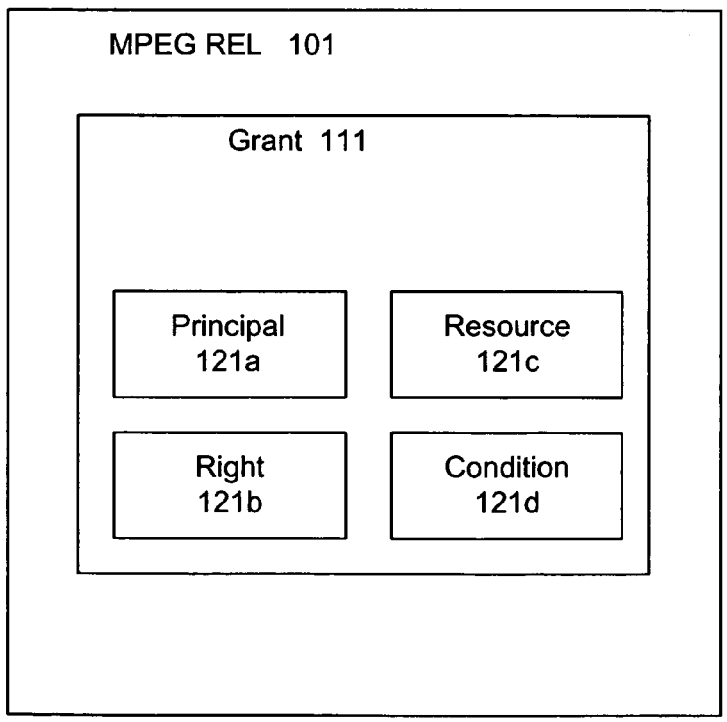
FIG. 1B illustrates an example of a structural block diagram of an MPEG REL legality expression in accordance with the present invention.

As an example, in FIG. 1B, an MPEG REL legality expression 101 is pictured. The unit of evaluation comprises a grant 111. Grant 111 is made up of atomic expressions including the principal 121*a* to whom the grant was made, the right 121*b* expressed in the grant, the resource 121*c*, and the condition 121*d* upon which the grant is made.

For convenience and brevity, in FIG. 1A, a single exemplary unit of evaluation 110, is shown with four example atomic expressions 120*a*, 120*b*, 120*c*, 120*d*, but an unlimited number of units of evaluation may comprise a legality expression. Likewise, each unit of evaluation may have an unlimited number of atomic expressions. While many more atomic expressions may be associated with each unit of evaluation, for illustrative purposes and for brevity, four atomic expressions are shown in FIG. 1A and in FIG. 1B, respectively.

Referring again to FIG. 1A, based on the semantic meaning of each unit of evaluation 110, the atomic expressions 120 that comprise it can be identified easily. Each atomic expression 120 is a conjunctive term of the unit of evaluation 110 and can be independently evaluated. The results of evaluating the atomic expression 120 in a unit of evaluation 110 are combined to make up the evaluation of the unit of evaluation 110. Thus, the data model for a unit of evaluation 110 disclosed in this invention is called the "evaluation model."

To evaluate the representation, let e be an atomic expression that can be independently evaluated. For example e is an atomic expression [p2] of unit of evaluation 2 in FIG. 9C. Let a(e,c) be an evaluation function of expression e against the context c. Section A.4.1 of the Appendix provides an example of an evaluation context c. Let l be an expression that represents a unit of evaluation. FIG. 9B illustrates an example unit of evaluation. Then, the evaluation model for the unit of evaluation can be expressed as:

l=combinatorial expression of ($e_i$), where i=1 . . . n $a(l,c) = a(e_1, c) \char`\^ \ldots \char`\^ a(e_n, c)$ Let t(e,l) be a function that returns the semantic type of the atomic expression e within the given unit of evaluation l. (For example, applying the function t(e,l) to [p2] in FIG. 9C, which has the semantic type of Principal, would evaluate t([P2]l) to Principal.) Let m(c, x) be a function that returns all expressions of the semantic type x in the context c. (For example, applying the example query context c described in section A.4.1 of the Appendix to, the function m(c, principal) will return a DSA key holder with specific values of p1, q1, and y1.) Then, the evaluation function is as follows:

a(e, c) can be evaluated if and only if:

x=t(e, l)

m(c,x) return null or m(c,x) return [$y_i$], i=1 . . . n, and there exists at least one i such that u(e, $y_i$), where u is the unification method as described below.

In other words, the algorithm can be described as:

a(e, c) can be evaluated if and only if:

c contains no expression that has the same semantic type as e. Thus the query context c does not care about this field;

or, if c contains at least one expression that has the same semantic type as e, then at least one of those expressions must unify with e.

The "pre-processor" described below with regard to the exemplary system provides detailed information on how an exemplary system can pre-process legality expressions into units of evaluation and atomic expressions prior to executing a query.

b. Profile

In many applications, different atomic expressions may represent the same object. A profile is a set of related expressions that are syntactically different but semantically the same—that is, a set of expressions that semantically represents the same statement. Use of a profile ensures that the evaluation of legality expressions against a (query) context is complete.

For example, an expression can represent Joe as a Microsoft .NET Passport holder; another expression can represent Joe as a holder of a public/private key pair, and so on. Section [A.5] in the Appendix describes an example of a profile. To extend the evaluation function described above, let ƒ(y) be a profile function that returns all the different expressions that represent the same object that y represents. (For example, with the example profile of [p2] as described in the section [A.5] of the Appendix, ƒ([p2]) will return a set of Joe, a specific DSA key holder and a specific Microsoft .NET Passport.) Then, the evaluation function in the previous section can be redefined as follows:

a(e, c) can be evaluated if and only if:

x=t(e, l)

m(c,x) return null or m(c,x) return [$y_i$], i=1 . . . n, and there exists at least one $y_i$ such that there is at least one $z_{ij}$ such that u(e, $z_{ij}$), where $z_{ij}$ in the set of [$z_{ij}$] returned from ƒ($y_i$), and u is the unification method as described below.

The "profiler" is further described below with regard to the exemplary system and provides detailed information on how an exemplary system can profile atomic expressions.

c. Unification Method

The unification method evaluates whether a query context object can be used to substitute for an atomic expression. The unification method evaluates an atomic expression against the context and resolves the conflict between the atomic expression and the result from the evaluation.

In general, an expression may contain variables, and the variables may or may not be constrained. If an expression does not contain any variables, it is called a "primitive expression." If the expression itself represents a variable, it is called a "variable expression."

If the units of evaluation returned by a query contain solely primitive atomic expressions, they usually do not need to be re-evaluated or validated, since they already serve as matches to the query specified in the context. If the query returns units of evaluation that are not primitive, they must be further evaluated.

For example, suppose the query returns an expression containing a variable for a principal, x, that has been bound to two different primitive expressions for key values, $y_1$ and $y_2$, thus $u(x, y_1)$ and $u(x, y_2)$. In this case, the expression must be evaluated to determine whether $y_1$ or $y_2$ can be substituted for x. The evaluation determines if unification may take place, that is if $u(y_1, y_2)$ or $u(y_2, y_1)$. If $u(y_1, y_2)$ occurs, then $y_2$ can be substituted for x. If $u(y_2, y_1)$ occurs, then $y_1$ can be substituted for x. This algorithm is used to revolve the values to which a variable is bound. Otherwise, neither $y_1$ nor $y_2$ can be substituted for x, and the expression returned from the query is discarded.

The unification function $u(e, y)$ specifies that e can be unified with y in three different instances:

First, if e is a variable expression, then it is either subject to constraints or it is not subject to constraints. If e is a variable expression with no constraints, then e can be unified with y for all y of the same semantic type. If e is a variable expression with some constraints, then e can only be unified with y if, when e is substituted by y, all the constraints are satisfied for all y of the same semantic type.

Second, if e is an empty expression (i.e., returns no values upon execution), then e can be unified with any expression y. For example, MPEG-REL grant 1 contains a right v to view the book b. Thus the principle p in grant 1 is an empty expression. Therefore, p can be unified with any principal such as x. This will translate to x is granted the right v to view the book b. This is similar to the case where expression e is a variable with no constraint. However, they are different in implementation since variable expression e must be bound to a value while an empty expression is not.

Third, otherwise, let $g_e$ be a graph that represents e. Let $g_y$ be a graph that represents y. Then, e can be unified with y if either graph $g_e$ is identical with graph $g_y$, or if every node in $g_e$ can be unified with the a node of the same semantic type in $g_y$. Also, the unification function can use a transform function that can create transformations of the given graph to attain semantically equivalent graphs. This generic algorithm will support a partial match between expressions. Section [A.7] in the Appendix illustrates examples of unification.

When an expression e can be unified with an expression y, then e can be substituted with y. Thus if $u(e, y)$, then e can be substituted with y.

Importantly, the unification function u is a one-way function; that e can be unified with y does not mean that y can be unified with e. Since the unification function is applied to each atomic expression independently, cases may exist where the same variable expression is unified with different values in different atomic expressions. The conflict resolution is therefore defined as follows:

If e is a variable expression with or without constraints, and $y_1$, and $y_2$ are atomic expressions such that $u(e, y_1)$ and $u(e, y_2)$, then e can only be substituted by $y_2$ if $u(y_1, y_2)$, or e can only be substituted by $y_1$ if $u(y_2, y_1)$. This is to resolve a variable which is bound to more than one value.

Third and lastly, if variable expression e cannot be substituted, then there is no answer for e within the given context c such that the function of $a(e, c)$ cannot be evaluated.

The "evaluator" is further described below with regard to the exemplary system and illustrates how an exemplary system can evaluate legality expressions using this unification method.

2. Exemplary System

The disclosed evaluation model presents a system that performs exemplary processing steps for a rights expression language, XrML, as one possible embodiment of the invention. However, this invention is not limited to any particular legality expression language or to XrML. The invention may be applied to any legality expression language.

FIG. 2 illustrates an exemplary system that efficiently processes grammar-based legality expressions using the invented processes. This exemplary embodiment comprises a pre-processor 220, a profiler 240, a repository 260, a selector 280, and an evaluator 290. Additionally, a legality expression input module 210 is used to initiate pre-processing of the legality expressions, query requestor 270 is utilized to initiate the selection and evaluation requestor 297 is utilized in the evaluation process of the atomic expressions, and context module 230 is used to construct the (query) context with which to select the matching atomic expressions, unit of evaluations, and processing instructions. Context module 230 may be a separate module or may be included in the query requestor 270. The output module 295 may receive the result from processed units of evaluation.

As shown again in FIG. 2, system 200 is comprised of modules that perform specific operations to carry out a method of efficiently processing grammar-based legality expressions in accordance with the present invention. The modules may be software sub-routines or program files called to perform specific operations to carry out the method of the present invention. While software modules are shown, it is to be understood that all or a portion of the exemplary embodiments can also be conveniently implemented by the preparation of application-specific integrated circuits or by interconnecting an appropriate network of component circuits. For simplicity and brevity, an exemplary embodiment utilizing software modules is shown in FIG. 2.

Legality expression input module 210 submits a legality expression to pre-processor 220. Pre-processor 220 partitions the legality expressions into units of evaluation as described above with regard to the evaluation model and as further described below with specific regard to the pre-processor. Each unit of evaluation is broken down into searchable independent expressions called "atomic expressions." Pre-processor 220 further ensures that the partitioning process conforms to grammar 222 and specification 224. Pre-processor 220 outputs units of evaluation, atomic expressions, and processing instructions to repository 260, which may store these outputs. Repository 260 makes these outputs available to profiler 240, which manages the profiles for all atomic expressions as proposed by the evaluation model. The units of evaluation and atomic expressions are indexed by the pre-processor 220 before being stored in repository 260 and made available to selector 280.

Query requestor 270 submits an input query request to the context module 230 to construct the (query) context and submits the (query) context to the selector 280 as the request. Selector 280 processes the input query request by locating the previously pre-processed units of evaluation and the associated atomic expressions in repository 260 that match the input query or utilizing those same outputs from profiler 240.

The selector 280 uses a matching mechanism based on a unification algorithm as described above with regard to the evaluation model.

The evaluation requestor 297 submits an evaluation request to the evaluator 290. The evaluator 290 first requests the context module 230 to construct the (query) context, then submits the (query) context to the selector 280 to retrieve the matching units of evaluation and the associated atomic expressions and processing instructions. The evaluator 280 evaluates the selected units of evaluation and the associated atomic expressions returned by the selector 280 against the given evaluation request and context 230 and determines if the match is satisfactory by evaluating the results against a prescribed evaluation criteria.

The pre-processor 220 and the profiler 240 are the preparation means to organize and manage the legality expressions and associated information. The selector 280 and the evaluator 290 are engaged upon receipt of a processing request to generate specific results. In other words, the pre-processor 220 and the profiler 240 are typically offline operations, whereas the selector 280 and the evaluator 290 perform real-time operations.

This example system represents one of many possible embodiments of this invention. Other embodiments may implement only some of these components or present themselves in different architectural structures that perform the same processing steps. Any system that incorporates the processing steps described above can efficiently process grammar-based legality expressions.

a. Pre-Processor

Figure 3:
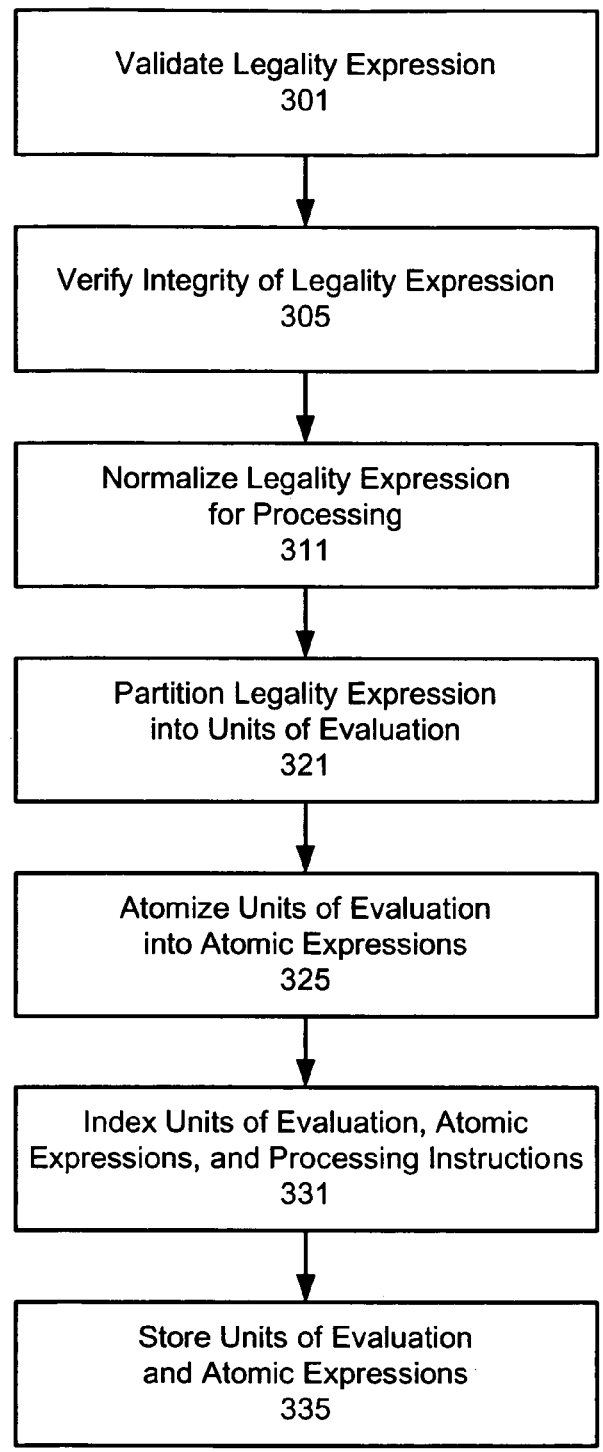
FIG. 3 illustrates the basic processing steps of the pre-processor of an exemplary system in accordance with the present invention.

FIG. 3 illustrates the basic processing steps of the pre-processor. The goal of pre-processing is to translate legality expressions into searchable independent expressions. Pre-processing involves validating the syntax of the legality expressions against the grammar, verifying the integrity of the legality expressions based on the application's trust model, normalizing legality expressions into a form suited for optimal machine processing, assessing the semantic meaning of the legality expressions, partitioning legality expressions into units of evaluation, atomizing units of evaluation into atomic expressions, indexing each unit of evaluation and atomic expression based on its semantic meaning, and storing the units of evaluation, their atomic expressions, and corresponding processing instructions into a searchable persistent repository.

At 301 in the "Validate" step, the pre-processor validates and verifies the legality expression against the grammar and specification. For example, in many XML-based legality expression languages, this step usually involves checking the expression's syntax against its XML schema and checking the expression's semantics against its specification. Other legality expression languages may employ other means to validate the syntax and semantics of their input expressions.

In the "Verify" step of 305, the pre-processor checks the integrity of the legality expression to make sure that it has not been changed or tampered with. Many legality expression languages, such as XML-based legality expression languages, support digital signatures as a mechanism to protect the integrity of the expression and to indicate its source. Using a digital signature requires trust between the signer and the verifier. Therefore, the mechanism to verify the trust and the integrity of the legality expressions relies on the trust mechanism used by the system.

In the "Normalize" step at 311, the pre-processor converts the legality expression into a form suited for optimal machine processing. The incoming legality expressions may be encoded in various ways. They may be digitally signed, and they may be security protected (i.e., encrypted). In addition, they may be packaged together with a resource such as a digital work or packed inside a resource, requiring them to be extracted from the package. Moreover, many different legality expressions may actually represent the same object, requiring canonicalization to produce a consistent representation of the input legality expression based on predefined methods. Canonicalization captures the essential characteristics of the object in a highly deterministic fashion by conforming to accepted rules and standards. The normalizing process addresses these issues and takes all of the necessary steps to transform incoming legality expressions into a single, normalized form. The normalized form can be device, platform, and storage independent.

The validate 301 and verify 305 and normalize 311 steps may be performed in either order with similar results. No constraints are imposed on the order in which the "Validate" and "Verify" and "Normalize" steps are performed on the input legality expressions.

At 321 in the "Partition" step, the pre-processor breaks the input legality expressions into units of evaluation. Since the structure of a legality expression is application domain-specific, the method of partitioning a legality expression into units of evaluation depends upon its semantic specifications. If parts of the input legality expression were encrypted, the pre-processor will decrypt the encrypted parts before breaking the input legality expression into units of evaluation.

According to the evaluation model, a unit of evaluation consists of a sequence of atomic expressions. The result of evaluating the unit of evaluation is the conjunction of the evaluation of the atomic expressions that comprise it. That is, the function is true only if all its arguments are true. Thus, the evaluation model proposes a method to convert the input expressions into a set of legality expressions by converting the input expression into a disjunctive normal form. An example disjunctive normal form is:

(A OR B) AND C; which equates to (A AND C) OR (B AND C)

This is represented symbolically by:

(A V B)^C; which equates to (A^C)V(B^C)

In general, a disjunctive normal form is represented mathematically as:

$(e_{l1}{}^{\wedge} \ldots {}^{\wedge}e_{ln}) \vee \ldots \vee (e_{m1}{}^{\wedge} \ldots {}^{\wedge}e_{mk})$ Each term $(e_{n1}{}^{\wedge} \ldots {}^{\wedge}e_{nm})$ in the disjunctive normal form is in conjunctive form, and therefore is considered a unit of evaluation. Section [A.2] in the Appendix illustrates how an MPEG REL legality expression as illustrated in FIG. 9A is partitioned into multiple units of evaluation.

For example, an XACL document usually contains an expression for the subject content, c, and an expression for the subject policy. The content expression c, in turn, consists of an expression for user information and bid information, while the policy expression contains disjunctive expressions for access rules, $r_1 \ldots r_n$. Thus, the XACL document can be modeled as:

$c^{\wedge}(r_1 \vee \ldots \vee r_n)$

This expression can be converted to its disjunctive normal form as follows:

$(c {}^{\wedge} r_1) \vee \ldots \vee (c {}^{\wedge} r_n)$

Then, each expression (c ^ $r_n$) becomes a unit of evaluation. In some cases, for example, $r_n$ may contain disjunctive expressions of subject and access, as follows:

```
<rule id="rule1">
    <acl>
        <subject> <uid> Alice </uid> </subject>
        <privilege type="read" sign="+"/>
        <privilege type="write" sign="+"/>
    </acl>
</rule>
```

Thus, $r_n$=s ^ (r V w), where s, r, and w are expressions for subject, privilege type "read", and privilege type "write".

Then, $r_n$ can be converted to (s ^ r) V (r ^ w) and c ^ $r_n$ converted to (c^s^r)V(c^s^w). Finally, each (c^s^r) and (c^s^w) are units of evaluation instead of c^$r_n$.

In another example, an XrML license usually contains one or more grants. Each grant $e_g$ contains a conjunction of expressions for a principal $e_p$, a right $e_a$, a resource $e_r$, and a condition $e_c$. Therefore, an XrML license can be written in the following form:

$$(e_{p1} \wedge e_{a1} \wedge e_{r1} \wedge e_{c1}) \vee (e_{pn} \wedge e_{an} \wedge e_{rn} \wedge e_{cn})$$

Thus, each grant ($e_{pn}$ ^ $e_{an}$ ^ $e_{rn}$ ^ $e_{cn}$) of the input XrML license is a unit of evaluation.

Further unit of evaluation examples in legality expressions include, but are not limited to, an agreement in a contract (such as obligation or prohibition clause), an activity (such as a business activity), an operation (such as a manufacturing operation), a rule in a policy, and a privilege or characteristic (such as a security token or a claim). The partitioning of the normalized legality expressions into their corresponding units of evaluation ensures all expressions are captured.

In the "Atomize" step of 325, the pre-processor breaks each unit of evaluation into searchable, independent atomic expressions. The atomize process includes resolving or cross-referencing interdependent atomic expressions. In the XrML example above, each grant $e_g$ is a unit of evaluation that contains atomic expressions for a principal $e_p$, a right $e_a$, a resource $e_r$ and a condition $e_c$. Section [A.3] in the Appendix describes how units of evaluation as illustrated in FIG. 9B are atomized to a set of atomic expressions.

At 331 in the "Index" step, the pre-processor organizes the units of evaluation, atomic expressions, processing instructions, and other data relevant for optimal query response time. For example, if an entity may be identified by different synonymous names such as a Microsoft .NET passport ID, email address, family name, nickname, and a frequent flyer number, an index can be created to associate the synonymous names together to facilitate fast search and response. Another example is creating a database table encompassing all of the atomic legality expressions associated with a frequently-queried entity to expedite all queries related to that entity.

Since atomic expressions can be evaluated independently, their content and semantic meaning should be indexed so that they can be easily retrieved later in the evaluation process. For example, if an XrML principal is of type "DSA key holder," the principal is also of the more generic type "key holder," and is also of the more generic type "principal, then the principal should be indexed as type DSA key holder, as key holder, as principal, and the principal's key value should also be indexed so that the search on any key holder, any DSA, and any principal will also return this specific instance of DSA key. FIG. 9D illustrates the proposed indices for atomic expression and section [A.8] in the Appendix describes the different types of semantic meanings of atomic expressions.

1) Different Organization Methods

Association and indexes are not the only way to store units of evaluation and atomic expressions along with their processing instructions. Different applications may use different organization methods to ensure efficient storage and retrieval.

a) Associate Sets of Key/Value Pairs with Legality Expressions

A first alternative organization method employs the pre-processor to associate sets of key/value pairs with legality expressions (or fragments of legality expressions). The sets of key/value pairs can be extracted from the legality expression or passed in separately.

Embodiments that provide key/value pairs to the pre-processor may generate them in a variety of ways. For example, the key/value pairs could be based on the context in which the legality expression was received. The context could provide information about possible intended use.

The key/value pairs could provide a range of information, such as metadata associated with fragments of the legality expression, validity periods for the legality expression, or information used to categorize the legality expression so that search spaces may be partitioned. These key/value pairs could then be used to limit the legality expression search space when processing an evaluation request.

For example, an online retailer may make special offers when the site has low traffic. To do this, they put in place dynamic offers that are considered to be in the search space when traffic is low. These offers are registered with a key (trafficLevel) and a value (low). When a consumer hits the retailer's web site, the server detects the traffic level and requests the offers registered with the trafficLevel key associated with a value equal to the current traffic level. If the current traffic level is low, the consumer receives all offers registered with a trafficLevel of low. Similarly, when the consumer buys an item, the web site server determines the trafficLevel and the special offers that apply to that trafficLevel. Those offers determine the price of the item, including any additional discounts that may apply at that time.

Associating key/value pairs with legality expressions can limit the search space and the number of legality expressions that must be evaluated. In the example above, environment data at the time of the request can be used in conjunction with the registered key/value pairs to limit the search space and thus provide faster results. Similarly, data extracted from the request, data provided by the user, or data obtained through other means can be used in conjunction with key/value pairs to limit the search space.

b) Assign Legality Expressions to Different Search Spaces

Second, the pre-processor can assign legality expressions to different search spaces based on certain criteria. The criteria could be extracted or determined from the legality expression or passed in separately. Possible partitioning schemes include using different database tables, using different processors or processor territories, and using different partition structures, but other partitioning schemes may be used as well.

If utilizing different database tables, complete legality expressions may be stored in different tables, analogous to a hash table. Each database table then represents one bucket in the hash table. Ideally, each incoming request would require a search space limited to one table. The number of tables to use would depend on a performance analysis and vary with each environment. In addition, legality expressions could be fragmented and stored in sub-tables.

Also, if using different processors or servers or processor territories, complete legality expressions may be stored in separate, independent search spaces, each of which is managed by a processor, for example, a hardware processor or management software. This scheme is also similar to a hash table, but each processor represents one hash table bucket. In addition, several processors may receive the same request in parallel, and results could be accumulated.

In a variation of this scheme, no pre-set association would exist between processors and search spaces. Instead, the processor that searches a specific search space is determined at request time. Several processors may search the available search spaces in parallel.

Additionally, if using different partition structures, complete legality expressions may be stored in different search spaces defined by partition structures, such as file system directories. For example, all legality expressions created, retrieved by, or otherwise associated with a specific user could be placed in that user's "Secure Documents and Settings" directory. Whenever the user is logged in, any requests would be made against the legality expressions in the user's "Secure Documents and Settings" directory.

c) Assign Expressions into Search Spaces of Different Priorities

Lastly, the pre-processor can assign legality expressions into search spaces of different priorities. Legality expressions can be stored in any logical or physical storage, but each search space is assigned a priority. Requests can then be applied against search spaces in priority order—the highest priority first, followed by next highest priority, and so on. In this case, a mechanism will exist for promoting or demoting legality expressions in search spaces of different priorities, perhaps based on the number of times that a legality expression is used or based on some other statistic. Any combination of these above approaches can also be used.

In the "Storage" step of 335, the pre-processor stores the units of evaluation, atomic expressions, and processing instructions in a searchable, persistent repository so that they can be retrieved efficiently for evaluation or query. During this step, the association between the units of evaluation, the atomic expressions, and the processing instructions must be maintained so that, given one piece of information, the other information associated with it can be retrieved easily. For example, given an atomic expression, it should be fast and efficient to retrieve the unit of evaluation to which it belongs. Similarly, given a unit of evaluation, it should be fast and efficient to retrieve all atomic expressions that comprise it.

Processing instructions may need to be associated with both the unit of evaluation and the atomic expression so that when they are retrieved for evaluation, the processing instructions will provide optimal means for evaluating them efficiently. Some processing instructions may be stored as separate data, while others may be part of the expressions. Although different applications may need different processing instructions, the most common processing instructions are the type of expression and the semantic type of the expression.

The type of the expression indicates whether an expression is primitive expression or variable expression. If an expression is variable expression, processing instructions should stipulate whether any constraint is associated with it. This information is used during the evaluation process to determine whether a given expression needs evaluation.

The semantic type of the expression is used during the evaluation process as described in the evaluation model disclosed above. An expression can be evaluated only against another expression of the same type.

Figure 4:
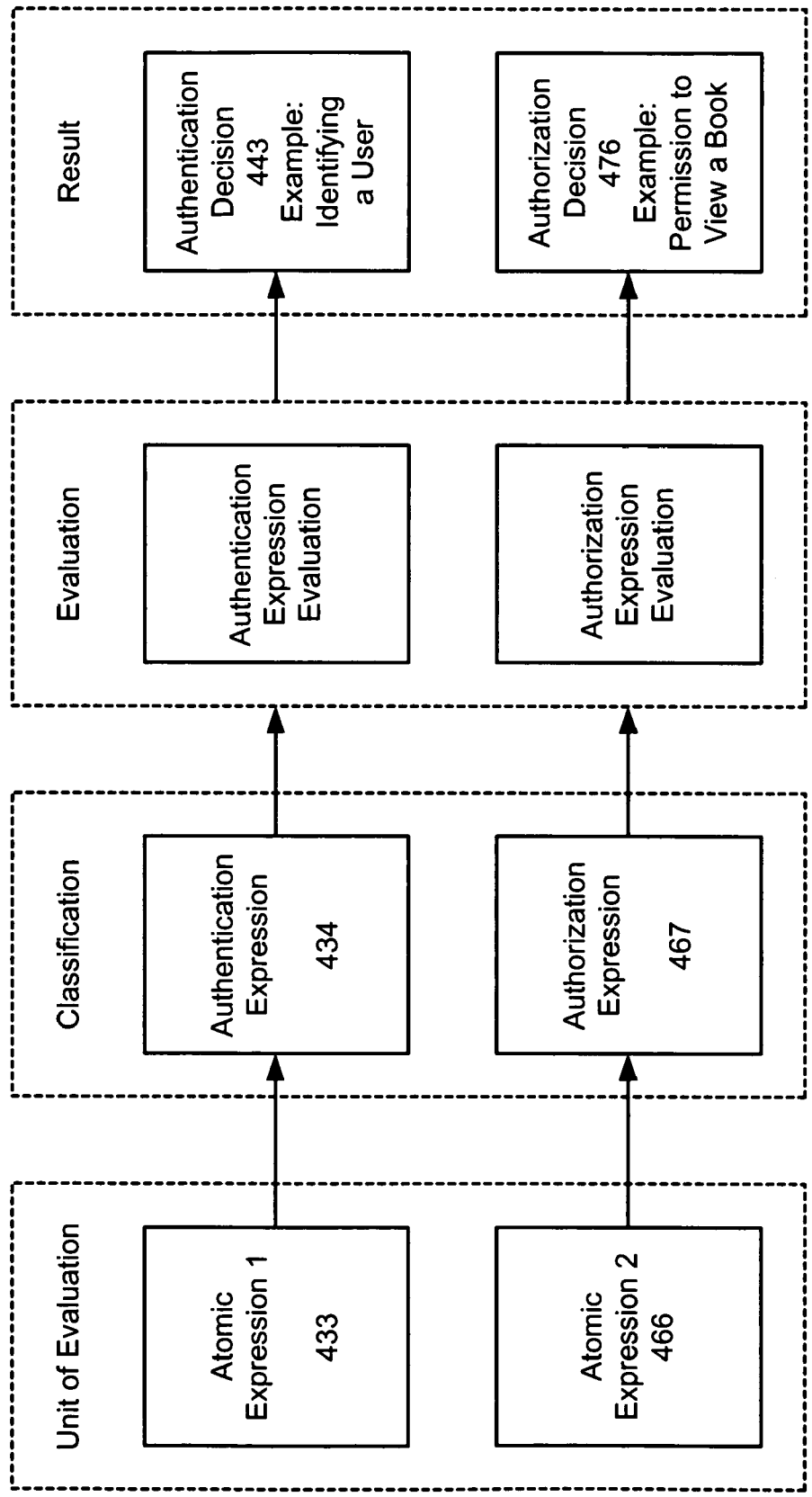
FIG. 4 illustrates example processing of atomic expressions with different semantic types typically found in digital rights management (DRM) applications.

FIG. 4 illustrates an example processing of atomic expressions with different semantic types typically found in digital rights management (DRM) applications. In DRM applications, atomic expressions are usually classified as authentication expressions or as authorization expressions. Atomic expression 433 is classified as an authentication expression 434 while atomic expression 466 is classified as an authorization expression 467. When evaluated, authentication expression 434 results in an authentication decision 443. Example authentication expressions include identification or certification of a user, a right, or a resource, such as a device. When evaluated, authorization expression 467 results in authorization decision 476. An example authorization expression is a permission that allows a user to view an electronic book.

Additional embodiments may vary in the storage mechanism and destination that they support. One example of a storage destination is a database. The process of storing the pre-processed results to a database could involve SQL INSERT commands. The "Example Rights Database" section provides an example of one possible database structure for storing pre-processed legality expressions in an embodiment that supports XrML.

b. Profiler

The profiler stores and manages the profiles within the system. A profile is a set of identifications assigned to or associated with an atomic expression. Each profile is uniquely identifiable by a profile ID. Profiling is the process of managing profiles for all atomic expressions.

For example, a profile for a digital song may contain the song title, the unique identification of the song, the URL of the song, and so on. The profile can be used during the indexing process to create all equivalent indices for a given atomic expression. The profile can be used during the selection process to broaden the query for an atomic expression from that expression's specific identification to all other identifications for that atomic expression.

In many cases, an atomic expression may have several identifications or the identification may be expressed in different ways syntactically. For example, a user named Joe can be identified by an XrML keyHolder, as follows:

```
<keyHolder licensePartId="Joe">
    <info>
        <dsig:KeyValue>
            <dsig:RSAKeyValue>
                <dsig:Modulus>KtdToQQyzA==</dsig:Modulus>
                <dsig:Exponent>AQABAA==</dsig:Exponent>
            </dsig:RSAKeyValue>
        </dsig:KeyValue>
    </info>
</keyHolder>
```

Joe can also be identified using a Microsoft .NET passport, as follows:

```
<passport>
    <userid>joe@hotmail.com</userid>
</passport>
```

Joe can also be identified as a person using the following three example representations:

```
<person>
    <ssn>123-45-6789</ssn>
    <licenseNumber>B7654321</licenseNumber>
</person>
<person>
    <ssn>123-45-6789</ssn>
</person>
<person>
    <licenseNumber>B7654321</licenseNumber>
</person>
```

Since the atomic expression, Joe, has multiple identifications, a request to determine whether Joe has the right to view a video clip may not return any matches if only legality expressions that contain Joe as an XrML keyHolder are evaluated. To ensure completeness, all legality expressions that refer to Joe using any of his identifications must be evaluated.

Some embodiments of the profiler may not produce and associate all permutations of the same atomic expression as seen with the <person> element described above. These embodiments may simply associate the different types of identifications that refer to the same atomic expression.

One way to implement a profile is to structure the profile so that it contains any number of identifications, each with an identification type and an identification value.

The identification type indicates the type of the identification value—either an expression or a constant. In the case of a constant, the identification type indicates the type of constant (such as a DSA key, an RSA key, a URI reference, a file reference, and the like).

The identification value is the constant value (such as the RSAKeyValue, DSAKeyValue, URI reference, and the like) or the expression value (such as ContentGuard Employee).

At an abstract level, a profile may look like this:

```
Profile (Profile ID)
[constant] Joe
    [constant] Passport holder P1 (joe@hotmail.com)
    [expression] ContentGuard employee
    [constant] Key holder P2 (KtdToQQyzA==, AQABAA==)
    [constant] Person P3 (123-45-6789, B7654321)
```

In an exemplary embodiment, the profiler indexes identifications and stores them in a searchable profile table (described below in the "Example Rights Database" section) in the persistent repository. To manage the profile, the profiler consists of two major functions, the profile update, and the profile query.

The profile update function is employed when creating a new profile or updating an existing profile. To speed up the query process, both Profile ID and Identification fields of the profile table are indexed.

The profile query function is utilized when retrieving the profile that contains all the identifications for the given atomic expression. Generally, the profile query function is used by the selector (see the "Selector" section below) to retrieve all known identifications for a given atomic expression to construct the alternative query to retrieve the set of legality expressions for a given request. Input to the query is either the profile ID or the identification value. When input is an identification value, the profile ID is retrieved and then used to retrieve all the identifications with the same profile ID.

c. Selector

Figure 5:
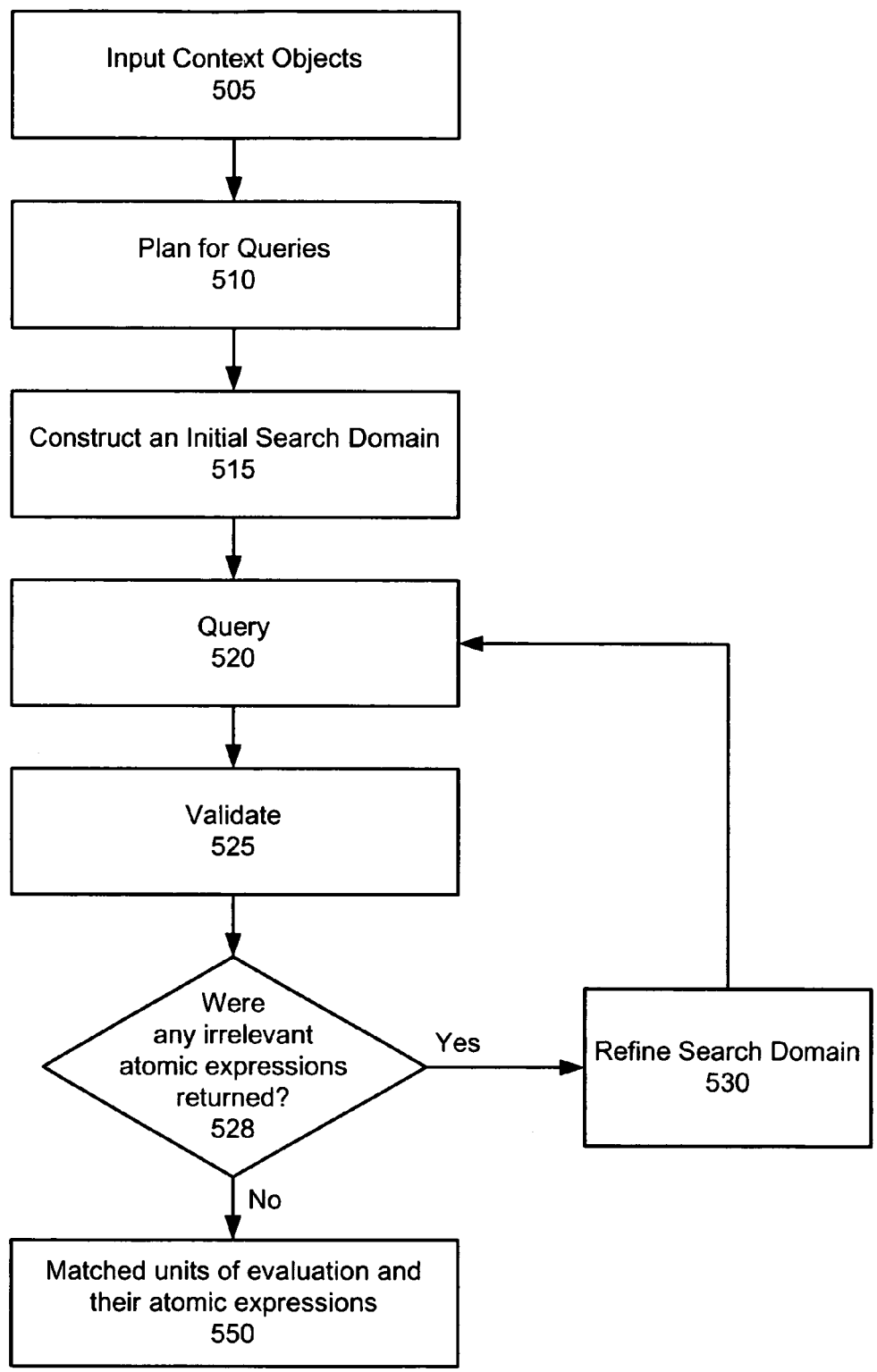
FIG. 5 illustrates the basic processing steps of the selector of an exemplary system in accordance with the present invention.

FIG. 5 illustrates the basic processing steps of the selector. The selector locates the units of evaluation, the atomic expressions, and the processing instructions from the repository to match the query context.

Since the selector queries against pre-processed legality expressions in the form of atomic expressions, the process of finding a match against many legality expressions is much faster than querying against legality expressions that have not been pre-processed. In addition, the time needed to process the matching expressions is reduced.

In the example embodiment, the selector supports any query on authentication expressions, authorization expressions, and combinations of authentication and authorization expressions.

As shown in FIG. 5, selecting involves planning for the queries from the input context objects in step 505, constructing the initial search domain for the queries, executing each query, validating the result, and possibly refining the search domain and making a modified query.

In the "Planning" step at 510, the selector examines each expression in the (query) context and plans for the queries in an optimal way. Different embodiments may implement different search optimizations for this step. For example the user-friendly query, "Does the principal P have the right R on resource r?" is translated into the optimal query context required by the system, which consists of "principal P", "right R", "resource r", and other information needed for the evaluation. Instead of translating or extracting key data from a user-friendly query to form an optimal query, some embodiments may simply take optimal inputs from the caller.

Also in the planning step, the selector retrieves the profile for each atomic expression in the (query) context and uses the profiles, if any, to construct queries to search for all legality expressions in the searchable persistent repository. Using the example query above, if the profile of the "principal P" is found and contains the following identifications:

```
Profile
    Profile ID
        Principal P
        Passport holder P1
        ContentGuard employee
```

Then, either one of the following independent queries is constructed:

```
[Principal P or Passport holder P1 or ContentGuard
    employee, Rights R, resource r]
    Or
[Principal P, Rights R, resource r]
[Passport holder P1, Rights R, resource r]
[ContentGuard employee, Rights R, resource r]
```

Context objects are the output of this planning step.

At 515, in the "Construct an Initial Search Domain" step, the selector constructs a search domain for the queries. The search domain is the subset of the searchable persistent repository that relates to the set of queries. Constructing the search domain limits the search scope. By reducing the search scope, performance is further improved. A query statement is the resulting output of the search domain construction step. Section [A.9] in the Appendix describes the query planning for each atomic expressions in the unit of evaluation.

In the "Query" step at 520, each query from the set of queries is executed. For each query, each atomic expression in the unit of evaluation is compared with the corresponding atomic expression in the query request. The query result is a set of atomic expressions that matched the expression specified in the query. In one example embodiment, the query results contain an expression ID that the selector uses to retrieve all atomic expressions that comprise each unit of evaluation identified by the query results.

Some embodiments of the selector may examine a query to see if it contains specific identifications for any of the atomic expressions. For each atomic expression that has a specific identification, the selector interacts with the profiler to retrieve all the possible identifications for the atomic expression. Then, the selector reconstructs the query for all identifications of that atomic expression.

Other embodiments of this invention implement the interaction with the profiler for creating queries for all the possible identifications of atomic expressions in some other component (such as the evaluator). An example embodiment is also possible in which the selector does not reconstruct queries based on the different identifications for a given atomic expression, but rather a user creates all possible queries based on the profiles for each atomic expression.

In the "Validate" step at 525, all the matching atomic expressions must be validated against the unification rules. The unification rules stipulate whether an atomic expression in a unit of evaluation can be unified with the corresponding atomic expression in the query request.

For example, a query for a principal named "John Doe" should return all expressions of the type principal according to the unification rules. If the returned expression is a variable expression with constraints, the selector validates all the constraints of the returned variable expression against the principal "John Doe."

An embodiment of this invention can build a semantically-knowledgeable Mutating Matcher component that combines unification with some of the responsibilities of the profiler. This Mutating Matcher component matches an atomic expression in a request with the corresponding atomic expression in the unit of evaluation in question. As part of the matching process, this component performs the task of analyzing all variations of the atomic expression from the request by interchanging the positions of any children to find permutations that are consistent with the semantics of the specific expression type and translating the identification of an atomic expression into other identifications to try to find a match.

For example, an XrML allPrincipals element is an atomic expression inside an XrML grant, which is a unit of evaluation. The allPrincipals element represents an entity that holds several identifications. When an allPrincipals is in a grant, at least all of the identities in the allPrincipals must be present in order for the grant to be exercised. If identities in addition to those specified in the allPrincipals element are present, the grant can still be exercised. An allPrincipals element can contain any number of identities, and the order of the identities is not significant. The following pseudo grant allows Fred and John to play a movie:

```
<license>
  <grant>
    <allPrincipals>
      <keyHolder>...Fred...</keyHolder>
      <keyHolder>...John...</keyHolder>
    </allPrincipals>
    <play!>
    <digitalResource>...www.mymovies.com/movie...</digitalResource>
  </grant>
</license>
```

A request is made asking if Fred, John, and Mary can play the movie. In XrML, that request would be represented by the following principal, right, and resource:

```
<allPrincipals>
  <keyHolder>...Fred...</keyHolder>
  <keyHolder>...John...</keyHolder>
  <keyHolder>...Mary...</keyHolder>
</allPrincipals>
<play/>
<digitalResource>...www.mymovies.com/movie...</digitalResource>
```

Determining whether the allPrincipals element in the request matches the one in the grant involves determining whether all the principals in the allPrincipals in the grant are in the set of principals in the request's allPrincipals element. An implementation of a Mutating Matcher component determines whether the two allPrincipals elements match according to the semantics of the allPrincipals element. Since the semantics of the allPrincipals element stipulate that all the identities must be present to exercise the grant, the Mutating Matcher component must check that Fred and John are both present in the request's allPrincipals element. Since the request's allPrincipals element includes a superset of the required identities (it includes Fred, John, and Mary), there is a match.

An embodiment of this invention can create an extensible architecture that allows the addition of unification or profiler plug-in components that are knowledgeable about the semantics of the atomic expressions that are being unified or profiled. Assuming that many unification or a profiling plug-in components may be present, the unification or profiling components to be used could be determined by an isSupported method that could take two atomic expressions and any additional context as parameters and return a Boolean value indicating whether it supports matching of two expressions.

After the "Validate" step of 525, the selector determines if any irrelevant atomic expressions were returned at step 528, and in step 530, "Refine Search Domain," irrelevant atomic expressions and their related units of evaluation are discarded from the search domain. The query can be made again against the refined search domain. Thus, the search domain is continuously refined after each query so that subsequent queries search more efficiently. With this mechanism, the performance of subsequent queries is dramatically improved until units of evaluation and their atomic expressions are successfully matched in step 550.

d. Evaluator

Evaluating is the process of comparing units of evaluation in the persistent repository with the given evaluation request and context. Since legality expressions in the system of the present invention have already been pre-processed, only the atomic expressions and, in some embodiments, the units of evaluation associated with the matching parts, are needed for evaluation, rather than evaluating the entire set of legality expressions.

Each atomic expression, such as a condition or obligation, is evaluated based on the current state of each legality expression. For efficiency, the evaluator may resolve conflict between units of evaluation, combine units of evaluation, or select particular units of evaluation from the selected set based on the application's policies.

Given an evaluation request against a given input context, the evaluator can validate the input context for the request, profile the expressions in the input context, retrieve the matching expressions (units of evaluation, atomic expressions, and processing instructions) for evaluation from the searchable persistent repository, validate each atomic expression, and validate each unit of evaluation.

Figure 6:
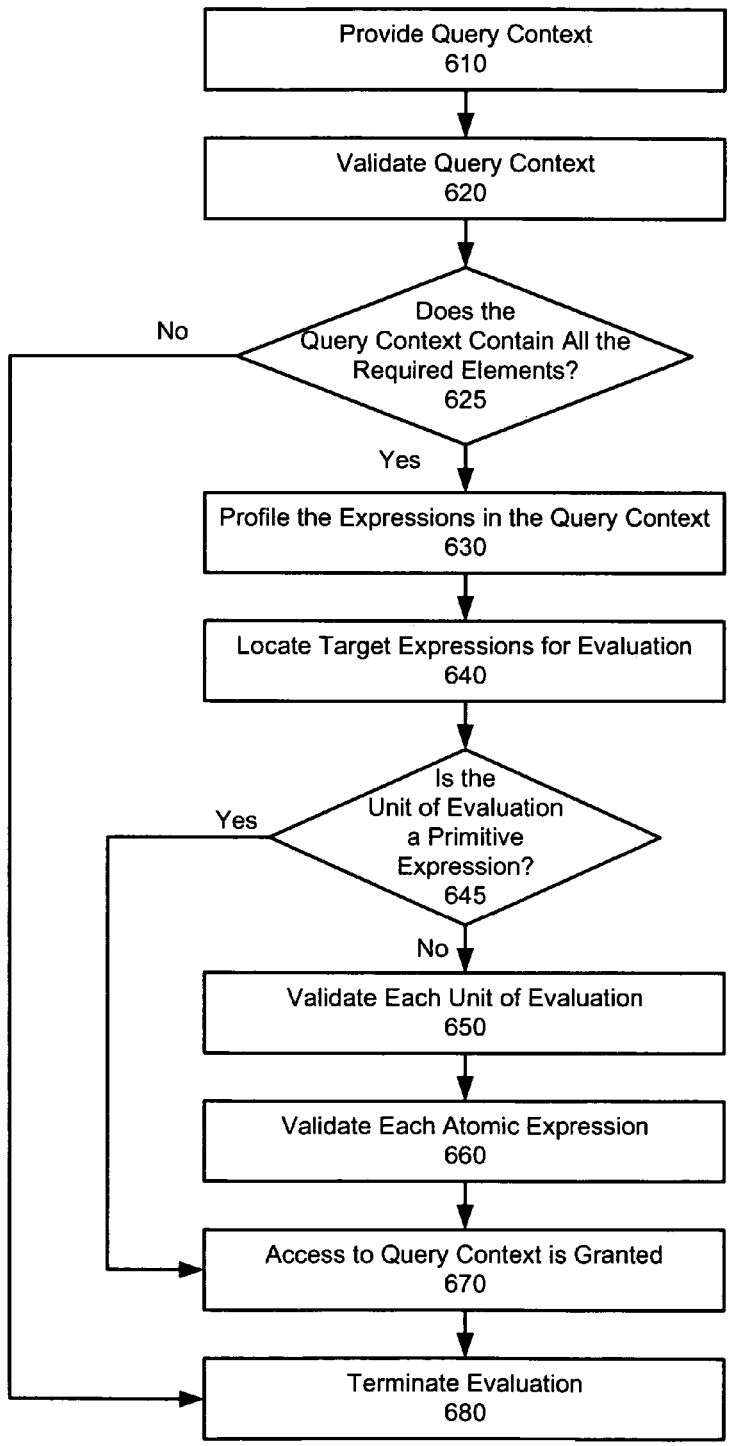
FIG. 6 illustrates the basic processing steps of the evaluator of an exemplary system in accordance with the present invention.

Referring to FIG. 6, an input context is provided in step 610. In the "Validate Input Context" step of 620, the input context for the request is validated. For example, an evaluation request may ask the question, "Does Joe have the right to view a book?" That request supplies the facts about Joe, the view right, and the book as the input context for the request. Before evaluating the request, the input context must be validated against the requirements of the application. For example, in both XrML and MPEG REL authorization story, the context must contains expressions for the requesting principal, the requested right, and the requested resource. In a CRF CEL application, the context may contain any combination of the expressions for trigger events, principal, act, and resource. In XACL, the context must contain the expressions for the content, subject, and access. In step 625, the evaluator determines if the input context contains all the required elements, and if the required elements are not present in the input context, an error occurs and the evaluation terminates at 680.

If the input context contains the required elements, at step 630 in the "Profile" step, the evaluator uses the profiler to profile each expression in the input context. As described in the "Profiler" section above, the profile contains all variations of the expression that the evaluator should take into account during evaluation. For example, the XrML keyholder representing Joe is the same as the passport holder with the ID joe@hotmail.com and the person with the social security number 123-45-6789. Thus, the profile of an expression that represents Joe returns all three expressions representing Joe. Constructing a profile for each context object is important to ensure that the evaluation is complete.

In the "Locate" step at 640, the evaluator uses the profiles and their semantic types to construct a query for the selector. The selector returns the set of first matching units of evaluation along with their associated atomic expressions and processing instructions. The first matching expressions are those that match the query, but that have not been validated yet.

If the units of evaluation returned by the selector are primitive expressions, the evaluator does not need to re-evaluate or validate them, since they already serve as matches to the query specified in the input context, and at step 645 the primitive expressions are passed through and access to the input context is granted at 670.

If the selector returns units of evaluation that are not primitive, the evaluator needs to evaluate them. At step 650 the system "Validates the Unit of Evaluation," and at 660 the system "Validates Each Atomic Expression." In these steps, the evaluator determines whether the matching expressions returned by the selector can be validated according to the evaluation model described above with regard to the unification rules. For example, if one or more expressions in a unit of evaluation contain variables, the evaluator needs to validate the binding of those variables. During the two "Validate" steps at 650 and 660, the evaluator follows any processing instruction that was associated to the returned units of evaluation and atomic expressions. Upon completion of the validating steps, access to the input context is granted at 670, and the evaluation terminates at 680.

In some applications such as those using the MPEG REL, CRF CEL, or XACML, evaluating a unit of evaluation usually results in an authorization or authentication decision. In other applications such as those using BPEL or PSL, evaluation of a unit of evaluation results in an activity or operation being carried out. For example, evaluation of an XrML grant against the input principal, right, and resource returns an authorization decision stipulating whether the input principal is allowed to exercise the input right over the input resource. Evaluating an XACML document against the input subject, content, and access results in an authorization decision stipulating whether the input subject is allowed to access the input content.

Beside the basic processing steps described above, embodiments of the evaluator may implement additional optimizations, such as caching requests and their corresponding results and pre-computing a set of expected common requests. Caching results may reduce costly computations due to common and frequent requests. The cache can be designed with a frequency for re-computing each cached request depending on the implementation. In addition, the cache may be implemented with self-destruct features. By pre-computing a set of expected common results, the evaluator could match incoming requests against the expected common set of requests, and, in the case of a match, return the pre-computed results. If the incoming request does not match any of the common set of requests, the evaluator would process the request as usual. The expected common results would be re-computed periodically, with the expiration time depending on the implementation. Re-computation may be triggered by a request that occurs after the pre-computed result expires.

3. Performance Improvements

The evaluation model of the present invention greatly improves the performance of systems that evaluate legality expressions. The following materials assess the performance improvements offered by the evaluation model and the exemplary processing steps disclosed by the present invention.

Legality expressions can be more efficiently processed if they are pre-processed to partition them into units of evaluation that, when evaluated, result in authentication decisions or authorization decisions. Further breaking each unit of evaluation into a set of atomic expressions dramatically improves the response time of the evaluation system since it is easier and more efficient to organize and store atomic expressions rather than entire legality expressions, and it is more efficient to process atomic expressions, because they are in a form that is ready for evaluation. When an atomic expression has been matched against the context, in some cases it does not need to be re-evaluated.

The improvement in processing time caused by implementing the pre-processor and selector functionality of this invention over a traditional method can be shown by mathematical means. Let N be the number of expressions in the searchable persistent repository. Let x be the time needed to process each legality expression using the traditional method, including the time needed to validate the syntax and semantics of the expression, verify its integrity, and interpret it. Let n be the number of matching expressions in the initial search domain N. Let y be the time needed to select each matching expression based on the proposed selection process. Then, the method as proposed in this invention will improve the response time when:

$(N)(x) > (n)(y)$

Or $N/n > y/x$

In the worst case scenario y=x, so the improvement ratio of this invention against the traditional approach is N/n, where N is the number of expressions for consideration (for instance, all those in the repository), and n is the number of expressions that match the query. Since n will always be less than or equal to N, the improvement ratio will never be less than one (that is, no performance loss).

Taking this a step further, it is expected that N will be much larger than n. That is, the set of expressions is much larger than the subset of matches. The conclusion is that the higher the number of expressions that an application is expected to consider, the larger the performance gains. Such gains are obvious in cases where N is in the thousands or hundred of thousands. Performance gains can be further highlighted in applications that receive common requests and implement the optimization ideas proposed for the evaluator's processing, such as caching requests.

Figure 7:
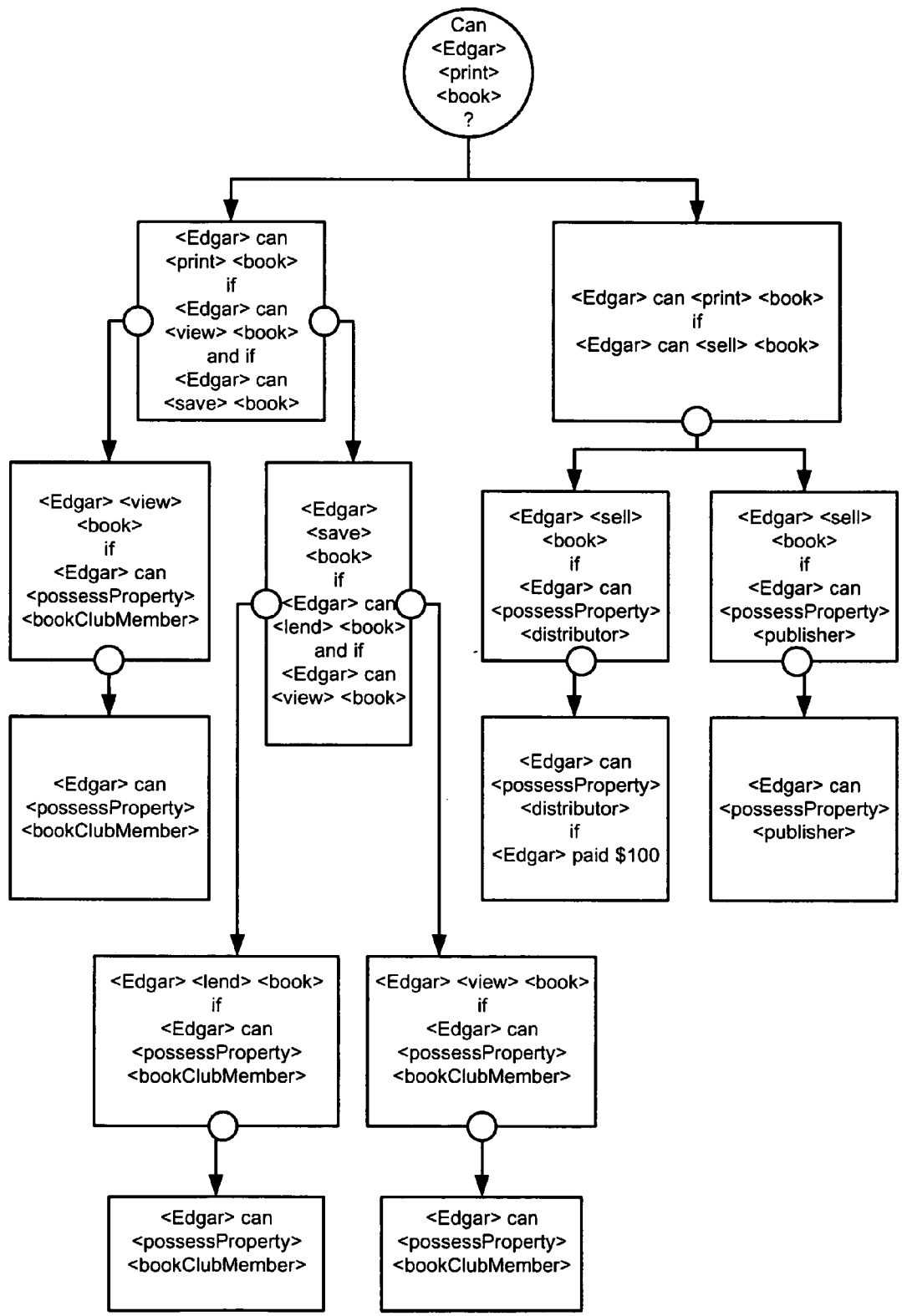
FIG. 7 illustrates an exemplary set of authorization options used to prove that a rights holder has the right to perform a particular task.

An embodiment of this invention can provide exponential gains in performance compared to a conventional legality expression processing system. FIG. 7 illustrates an example set of authorization options that can be used from a high level to better understand how exponential gains in efficiency are possible. For this example, consider a rights authorization request that asks, "Can Edgar view the book?" Answering this question could potentially require answering many sub-queries. In FIG. 7, the large circle represents the original authorization request query (Can Edgar print the book?). Each small circle represents a sub-query that is made. Each box represents a rights expression that authorizes a request (for example, <Edgar>, can <print>, <book> If <Edgar>, can <sell>, <book>). For this example, assume that these rights expressions are in a repository that contains 10,000 rights expressions. Without any pre-processing or caching, the system that produced this authorization forest (note that there are two trees that satisfy the original request) would need to process all 10,000 rights expressions for each of the 11 queries. However, using the processes proposed in this invention would enable time savings for each of queries processed, resulting in exponential performance gains.

4. Example Rights Database

Figure 8:
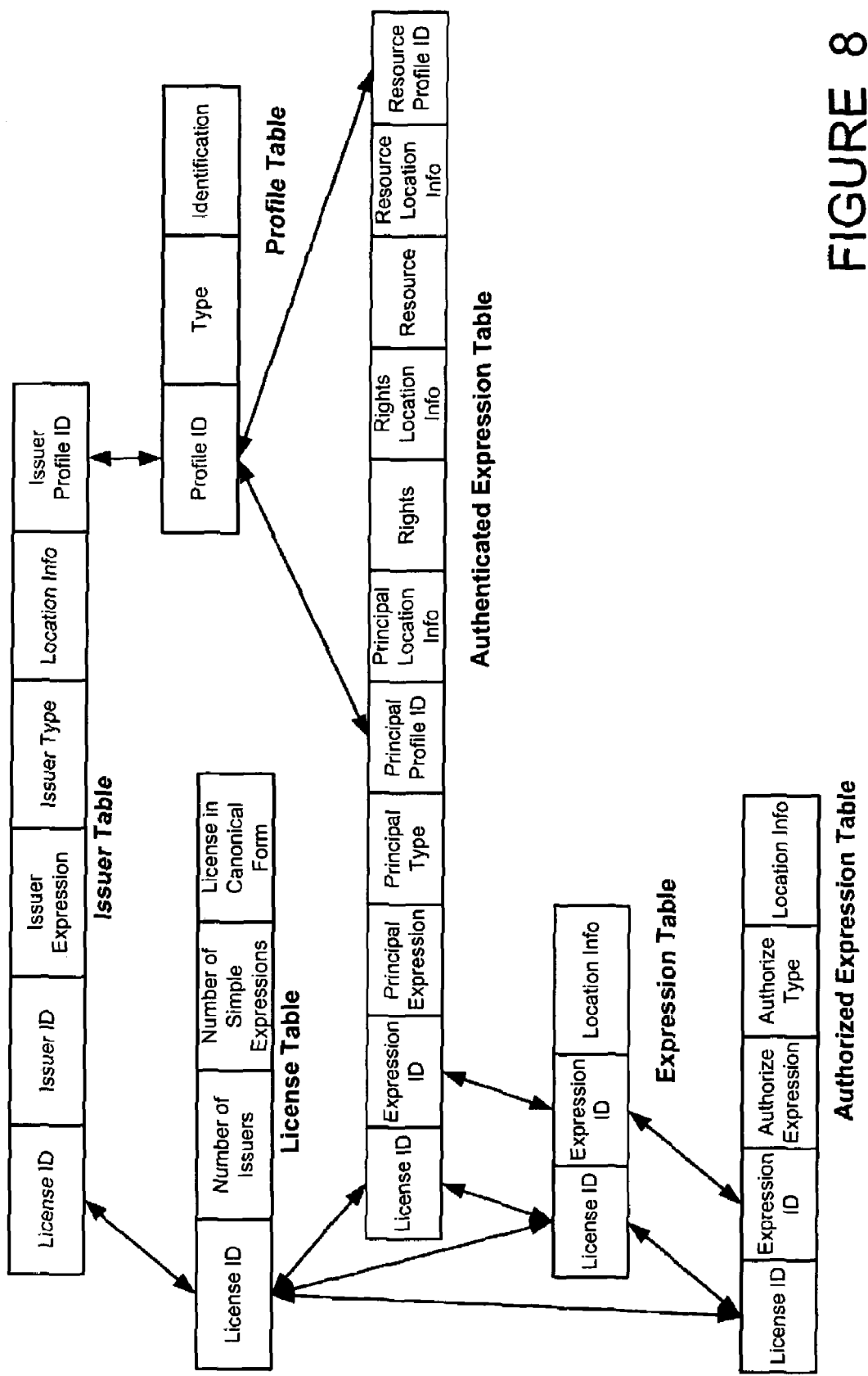
FIG. 8 illustrates an exemplary embodiment of a data model for pre-processed legality expressions.

FIG. 8 illustrates an exemplary data model for an embodiment of the present invention that supports XrML. The example data model captures the output of the pre-processor and profiler. FIG. 8 illustrates how an exemplary pre-processor implementation can partition XrML expressions into units of expression and atomic expressions. Additionally, the pre-processor implementation can store XrML expressions into a database and identify sets of expressions that are different syntactically but the same semantically and represent that information in a database.

The profiler and the selector query against this data when requested by the evaluator.

This data model consists of several database tables, each of which contains the specified fields to represent the output of the pre-processor and the profiler.

Profile Table—Contains profiles for atomic expressions.
  Profile ID—The primary key to refer to a profile.
  Type—Type of the identification.
  Identification—Expression of the actual value of the resource.
License Table—Contains the licenses in the searchable persistent repository.
  License ID—The primary key to refer to a license.
  Number of Simple Expressions—Total number of grants as units of evaluation in the license identified by the License ID.
  Number of issuers—Number of issuers of the license identified by the License ID.
  License in Canonical Form—The canonical form of the license.
Expression Table—Contains a mapping between each of the expressions and the corresponding license.
  Expression ID—The primary key to refer to an expression.
  License ID—The primary key to refer to a license.
  Location Info—Location of this expression within the license. This information is used to verify the integrity of the expression against its license.
Authenticated Expression Table—Contains information about the authenticated expressions.
  Expression ID—The primary key to refer to an expression
  License ID—The primary key to refer to a license
  Principal Expression—The actual value that represents the principal.
  Principal Type—The principal type, either expression or a type of value (such as DSA key, RSA key, and the like). This field is used as the search field if the query is based on the principal type instead of the specific value of the principal.
  Principal Location Info—Location of the principal expression within its atomic expression. This information is used to verify the integrity of the principal expression within its atomic expression and its license.
  Principal Profile ID—The principal's profile contains all identifications of the given principal.
  Rights—Expression for the right
  Rights Location Info—Location of the rights expression within its atomic expression This information is used to verify the integrity of the rights expression within its atomic expression and its license.
  Resource—Expression for the resource.
  Resource Profile ID—The resource's profile contains all identifications of the given resource.
  Resource Location Info—Location of the resource expression within its atomic expression This information is used to verify the integrity of the resource expression within its atomic expression and its license.
Authorized Expression Table—Usually authorized expressions operate on different sets of data. Therefore, each type of authorized expression or each group of authorized expressions is stored in a separated table. All authorized expression tables have the following fields:
  Expression ID—The primary key to refer to an expression
  License ID—The primary key to refer to a license
  Authorize Type—Type of the authorized expression Location Info—Location of the authorized expression within its atomic expression. This information is used to verify the integrity of the resource expression within its atomic expression and its license.

Authorize Expression—Name of the authorized expression

APPENDIX

A.1 Example of a Pseudo License in MPEG REL

FIG. 9A illustrates a pseudo MPEG REL license 1 which consists of one grant [g1] and a grant group [G].

The grant [g1] specifies that any DSA Key Holder [p1] is granted the right to play [a1] a song [r1], "Nocturne in A minor, Chopin." According to the disclosed evaluation model, the grant [g1] can be represented as follows:

$$g1 = p1\widehat{\;}a1\widehat{\;}r1$$

The grant group [G] specifies that a principal [p2], a specific DSA Key Holder, is granted the rights to play [a2] plus the rights to copy [a3] the songs [r2], [r3], "any symphony of Beethoven" as specified in the grants [g2] and[g3]. The right to copy [a3] is only valid if the condition [c3] is satisfied at the time that right [a3] is exercised. Thus, according to the disclosed evaluation model, the grant group [G] can be represented as follows:

$$G = (p2)\widehat{\;}((a2\widehat{\;}r2) \lor (a3\widehat{\;}r3\widehat{\;}c3))$$

Thus, the license 1 in FIG. 9A can be represented as follows:

License l=g1 V G, or

License $l=(p1\widehat{\;}a1\widehat{\;}r1) \lor (p2)\widehat{\;}((a2\widehat{\;}r2) \lor (a3\widehat{\;}r3\widehat{\;}c3))$ A.2 Unit of Evaluation—Optimized Legality Expression Structure The license 1 as illustrated in FIG. 9A is optimally represented according to the syntax of the MPEG REL grammar. Since expressions specified in license 1 contains a random combination of both conjunctive and disjunctive forms, it is not optimal to evaluate the license l in its current form. The disclosed evaluation model proposes the expression represented the license 1 is converted to a disjunctive normal form. Thus, License $l=(p1\widehat{\;}a1\widehat{\;}r1) \lor (p2)\widehat{\;}((a2\widehat{\;}r2) \lor (a3\widehat{\;}c3))$ can be mathematically converted to:

License $l=(p1\widehat{\;}a1\widehat{\;}r1) \lor ((p2\widehat{\;}r2\ \widehat{\;}a2) \lor (p2\widehat{\;}r3\widehat{\;}a3\widehat{\;}c3))$, or License $l=(p1\widehat{\;}a1\widehat{\;}r1) \lor (p2\widehat{\;}a2\widehat{\;}r2) \lor (p2\widehat{\;}a3\widehat{\;}r3\widehat{\;}c3)$ The reason for the second form is to be consistent with the order of terms defined in MPEG-REL. However, within a unit of evaluation, the order of the conjunctive terms (atomic expression) within each disjunctive term (unit of evaluation) is not critical.

Each of the conjunctive expressions (p1^a1^r1), (p2^a2^r2), and (p2^a3^r3^c3) will be a unit of evaluation according to the disclosed evaluation model.

FIG. 9B illustrates an expression that represents the license 1 in FIG. 9A partitioned into an optimized structure that consists of three independent units of evaluation.

Unit of evaluation u1: (p1 ^ a1 ^ r1), in the context of the license 1 as illustrated in FIG. 9A. This unit of evaluation specifies that the principal [p1], any DSA Key Holder, is granted the right to play [a1] the song [r1], "Nocturne in A minor, Chopin."

Unit of evaluation u2: (p2 ^ a2 ^ r2), in the context of the license 1 as illustrated in FIG. 9A. This unit of evaluation specifies that the principal [p2], a specific DSA Key Holder, is granted the right to play [a2] any song [r2], "Any Beethoven symphony."

Unit of evaluation u3: (p2 ^ a3 ^ r3 ^ c3), in the context of the license l as illustrated in FIG. 9A. This unit of evaluation specifies that the principal [p2], a specific DSA Key Holder, is granted the right to copy [a3] any song [r3], "Any Beethoven symphony" and the condition [c3] stipulates that only two copies are allowed.

Each unit of evaluation that comprises the license l is an independent statement that, when evaluated, will result in a decision of whether or not to grant the requesting principal the requested right to use the requested resource.

A.3 Atomic Expression

Each unit of evaluation can be further atomized into atomic expressions for efficient indexing, storage, retrieval, and evaluation. Atomic expressions are expressions that made up a unit of evaluation and are independently evaluated. Independent evaluation means the result of the evaluation of an atomic expression is independent of the result of the evaluation of other atomic expression that make up the same unit of evaluation.

Atomic expressions for unit of expression u1—consisting of 3 independent expressions:
  expression for principal [p1], any DSA Key Holder;"
  expression for play rights [a1]; and
  expression for resources [r1]: Nocturne in A minor, Chopin.

Atomic expressions for unit of expression u2—consisting of 3 independent expressions:
  expression for principal [p2], a specific DSA Key Holder;"
  expression for play rights [a2]; and
  expression for resources [r2], Any Beethoven's symphonies.

Atomic expressions for unit of expression u3—consisting of 4 independent expressions:
  expression for principal [p2], a specific DSA Key Holder;"
  expression for copy rights [a3];
  expression for resources [r3], Any Beethoven's symphonies; and
  expression for condition [c3], Exercise limit count=2.

A.4—Example of Query Contexts

A.4.1—The context for the request, "Can the DSA Key Holder with a specific p1, q1, y1 play the song: Beethoven, Ninth Symphony?" can be represented as follows:

```
Query Context c
{
  Principal = Specific DSA Key Holder with p1, q1, y1 key value
  Right = Play
  Resource = "Beethoven, Ninth Symphony"
}
```

A.4.2—The context for the request, "Can the song Beethoven, Ninth Symphony be played?" can be represented as follows:

```
Query Context c
{
```

-continued

```
        Right = Play
        Resource = "Beethoven, Ninth Symphony"
}
```

A.5—Examples of a Profile

Figure 9C:
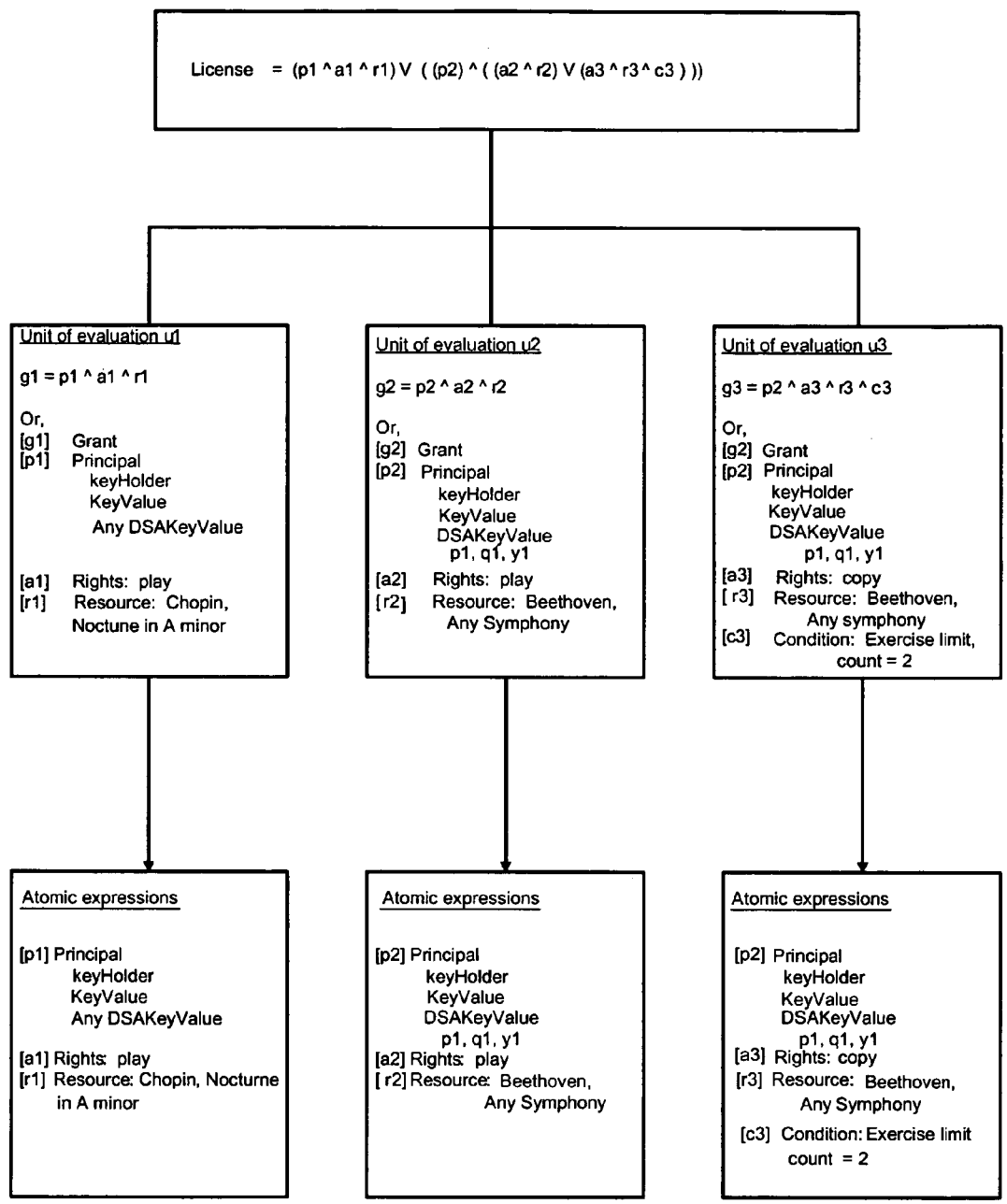
FIG. 9C illustrates an example of atomic expressions that comprise units of evaluation in an MPEG REL license.
Figure 9D:
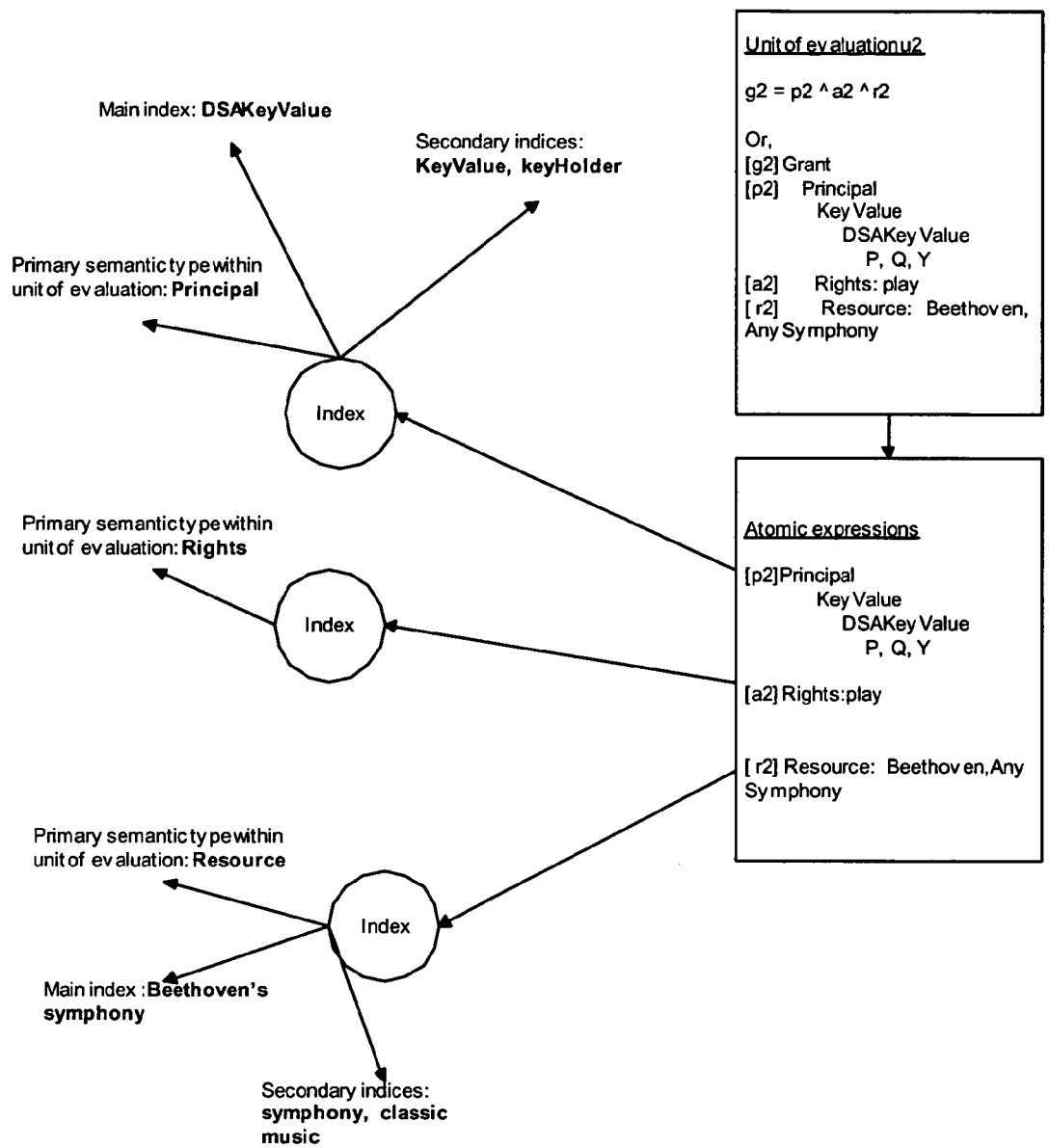
FIG. 9D illustrates an example of indices of atomic expressions in an MPEG REL license.

A principal [p2] in FIG. 9C with a specific DSA Key Holder with P, Q, Y key values is also known as Joe, and is also known as a specific Microsoft .NET Passport holder. Thus the profile for [p2] is as follows:

```
Profile f
{
        Joe
        Specific DSA Key Holder with p1, q1, y1 key value
        Specific Microsoft .NET Passport holder with passport value
}
```

A.6—Example of Semantic Type

The principal [p2] in FIG. 9C is an atomic expression of the unit of evaluation u2 in FIG. 9B. Within the context of unit of evaluation u2, the primary semantic type of [p2] is a Principal within a Grant expressed in MPEG REL.

However, within the context of MPEG REL, the semantic type of this particular Principal [p2] is a DSA Key Holder identified by the values of the DSA key.

A.7—Example of Unification

A definition of a DSA Key Holder principal in MPEG REL is as follows:

```
        Principal
            keyHolder
                info
                    KeyValue
                        DSAKeyValue
                            P
                            Q
                            Y
```

A.7.1—Suppose that an atomic expression e is a specific DSA Key Value with p1, q1, y1 and an expression x which has the same semantic type as e and also has a specific DSA Key Value with p1, q1 and y1, then e is unified with x, and x can be used to substitute for e.

```
        e = keyHolder
                info
                    KeyValue
                        DSAKeyValue
                            p1
                            q1
                            y1
        x = keyHolder
                info
                    KeyValue
                        DSAKeyValue
                            p1
                            q1
                            y1
```

A.7.2—Suppose that an atomic expression e is a DSA Key Value with no specific P, Q, Y, and an expression x, which has the same semantic type as e and has a specific DSA Key Value with p1, q1, and y1, then e is unified with x, and x can be used to substitute for e.

```
        e = keyHolder
                info
                    KeyValue
                        Any DSAKeyValue
        x = keyHolder
                info
                    KeyValue
                        DSAKeyValue
                            p1
                            q1
                            y1
```

A.7.3—Suppose that an atomic expression e is a Key Value with no specified key type, and x1 is a DSA Key Value with no specific P, Q, Y, and an expression x2, which has the same semantic type as e and has a specific DSA Key Value with p1, q1 and y1, then e is unified with both x1 and x2, and either x1 or x2 can be used to substitute for e.

```
        e = keyHolder
                info
                    KeyValue
        x1 = keyHolder
                info
                    KeyValue
                        Any DSAKeyValue
        x2 = keyHolder
                info
                    KeyValue
                        DSAKeyValue
                            p1
                            q1
                            y1
```

However, when e is unified with both x1 and x2 within the same unit of evaluation, then if x1 is unified with x2, then e can only be substituted by x2, if x2 is unified with x1, then e can only be substituted by x1. Otherwise, e cannot be substituted with either x1 or x2. In the above example [A.7.3], e is unified with both x1 and x2, and x1 is unified with x2. Therefore, x2 is used to substitute for e, NOT x1.

A.8—Example of Indices

FIG. 9C describes the unit of evaluation 2 with its atomic expressions as follows:

Atomic expression [p2], a specific DS Key Holder with key value p1, q1, y1:

Primary semantic type in the context of the unit of expression u2: Principal

Secondary semantic types in the context of the MPEG REL: DSAKeyValue, KeyValue, keyHolder Atomic expression [a2], a right to play Primary semantic type in the context of the unit of expression u2: Rights Secondary semantic types in the context of the MPEG REL: not specified Atomic expression [r2], any Beethoven symphonies:

Primary semantic type in the context of the unit of expression u2: Resource

Secondary semantic types in the context of the MPEG REL: Beethoven symphonies, any symphonies, classical music FIG. 9D describes the possible indices for any atomic expression. Indices for atomic expressions are based on their semantic meanings or types. There are two types of semantic meanings:
1. The semantic meaning or type in the context of the unit of evaluation. For MPEG REL, a semantic meaning or type of an atomic expression is one of principal, rights, resource, conditions expressions, etc.
2. The semantic meanings or types in the context of the language. For example, in MPEG REL a specific DSA Key Holder principal is a KeyValue and also a key-Holder. The semantic meanings within the language are further classified into two types of indices. The main index is the actual type of the atomic expression, while the secondary indices are more generic types of the main index.

A.9—Example of Planning and Executing Queries

Given Joe whose profile is specified in the example in section [A.5]

A.7.1—Profile f

```
{
    Joe
    Specific DSA Key Holder with p1, q1, y1 key value
    Specific Microsoft .NET Passport holder with passport value
}
```

A license l as specified in FIG. 9A and section [A.1] is partitioned into units of evaluations and atomic expressions as described in sections [A.2] and [A.3]. All the atomic expressions are indexed as described in section [A.8].

Given that Joe requests authorization to play the Ninth Symphony, Beethoven, then the request consists of the following facts that made up a query context:

```
Context{
    Principal = Joe
    Rights = Play
    Resource = Ninth Symphony, Beethoven.
}
```

A.9.1—Planning Queries for the Context Object: Principal

To plan for the query, first the profile for each context object is retrieved. For example, the profile for Joe includes the following object O:

```
O: Principal
    keyHolder
        KeyValue
            DSAKeyValue
                p1, q1, y1
```

Since O is a specific DSA Key Holder, the primary semantic meaning (or type) of O is a principal, the main index of O is DSAKeyValue, and the secondary indices of O are KeyValue and keyHolder. So, the planning queries include the following search:
1. Search on any principal with the main index is DSAKeyValue, and if P, Q, Y are specified, then P, Q, Y must match with p1, q1, y1 respectively. Thus, the principal [p2] of the unit of evaluation 2, and [p2] of the unit of evaluation 3 in FIG. 9C will be a match of the query. However, [p1] in unit of evaluation 1 in FIG. 9C will not be a match since its main index is not DSAKeyHolder but KeyValue.
2. Search on any principal with the main index is KeyValue. Thus, principal [p1] of the unit of evaluation 1 in FIG. 9C will be a match since its main index is KeyValue.
3. Search on any principal with the main index is keyHolder.

Thus, the queries for the context object Principal once executed, will return the following atomic expressions:
[p1] of unit of evaluation u1
[p2] of unit of evaluation u2
[p2] of unit of evaluation u3

And the search domain is now restricted to all atomic expressions of the units of evaluation u1, u2 and u3 instead of the entire database.

A.9.2—Planning Queries for the Context Object: Rights

Similar to the principal in the context, the profile for Play right is retrieved. If it is not found, that is there is no profile associated with this Play right, then only queries related to this Play right is planned. Also, there are no secondary indices associated with Play right as described in section [A.8], therefore the queries to retrieve all matching atomic expressions for the Play right against the search domain resulted from the previous query are as follows:
Search on any right where the main index is Play. Once again, this query will match with the atomic expression [a1] play of the unit of evaluation u1 and [a2] play of the unit of evaluation u2. While [a3] copy of unit of evaluation u3 is not matched.

Thus, the query for the context object Rights once executed, will return the following atomics expressions:
[a1] of unit of evaluation u1
[a2] of unit of evaluation u2

No atomic expression of unit of evaluation u3 matched, therefore u3 is removed from the search domain. The search domain is now refined to atomic expressions of the units of expression u1 and u2 only.

A.9.3—Planning Queries for the Context Object: Resources

Similarly to the principal in the context, the primary semantic type of the Ninth Symphony, Beethoven in the context is resource, the main index is Beethoven Symphony, the secondary indices are Symphony, Classic Music. So the planning queries for the resource include:
1. Search on any resource with the main index is Beethoven Symphony, and its value if specified is Ninth Symphony. Thus the resource [r2] of the unit of evaluation u2 is a match since the main index is Beethoven Symphony with no value specified. However, [r1] of the unit of evaluation 1 in FIG. 9C will not be a match. Notice that even though [r3] of the unit of evaluation u3 in FIG. 9C could be a match of the query, since u3 is no longer in the search domain, it is not a match.
2. Search on any resource with main index is Symphony.
3. Search on any resource with main index is Classic Music Thus, the queries for the context object Resource, once executed, will return the following atomic expression:
[r2] of the unit of evaluation u2

No atomic expression of unit of evaluation u1 matched, therefore all atomic expressions of unit of evaluation u1 are removed from the search domain. The search domain now only contains unit of evaluation u2 and its atomic expressions.

A.10—Example of Evaluating

Once all the planning queries have been executed, all the units of evaluation remaining in the search domain will be matched with the query context. Each unit of evaluation in the search domain will be further evaluated to resolve conflicts, if any, between its atomic expressions and any conflict between matched units of evaluation.

The conflict between atomic expressions are defined as:
If a variable is bound to more than one type; or
If a variable is bound to more than one value; or
If a variable must be bound to some value but it is not.

In the query examples described in [A.9], the only matching unit of evaluation remaining in the search domain is u2. Since u2 does not contains any variable, u2 is the true match to the query context. Consequently, Joe's request for an authorization to play the Ninth Symphony, Beethoven will be granted. On the other hand, suppose that u2 is a matching unit of evaluation, and u2 contains variable x for the principal (thus p2) and also variable x for resource (thus r2). Let's substitute x for the context object (as defined in [A.9]) of the same type, then p2 is substituted by "Joe" while r2 is substituted by "Ninth Symphony, Beethoven." Since "Joe" and "Ninth Symphony, Beethoven" are two different things, they cannot be substituted for each other. In this case, the conflict cannot be resolved. Therefore, u2 is rejected. As a result of this evaluation, Joe's request for an authorization to play the Ninth Symphony, Beethoven will not be granted.

The present invention may be implemented by a general purpose computer programmed to accomplish the disclosed functions. Accordingly, the modules described herein can be implemented as computer hardware and/or computer software. Various devices may be used to provide the computer or computer system for effecting the invention.

While the present invention has been described in connection with a number of exemplary embodiments and implementations, the present invention is not so limited but rather covers various modifications and equivalent arrangements which fall within the purview of the appended claims.

What is claimed is:

1. A method of processing grammar-based legality expressions that are adapted to be used within a system for enforcing licenses, the method comprising:
   partitioning at least one legality expression into one or more units of evaluation to assess the semantic meaning of the legality expression; and
   indexing at least one of the units of evaluation and the atomic expressions for subsequent retrieval based on the semantic meaning of each unit of evaluation and each atomic expression, the atomic expressions denoting the constituent components of the units of evaluation for storage, retrieval, and evaluation of the legality expressions,
   wherein the indexing step further comprises assigning legality expressions to separate search spaces based upon predetermined criteria, and associating sets of key values with legality expressions where the sets of key values provide additional information related to the legality expressions.

2. The method of processing grammar-based legality expressions of claim 1, further comprising unifying a query context object and an atomic expression by evaluating the atomic expression against the context and resolving conflicts between the atomic expression and the result of the evaluation.

3. The method of processing grammar-based legality expressions of claim 2, further comprising:
   creating profiles representing semantic meanings of the atomic expressions; and
   classifying the atomic expressions into the corresponding profiles, the profiles comprising a set of identifications assigned to the atomic expressions.

4. The method of processing grammar-based legality expressions of claim 3, wherein the classifying step further comprises assigning a uniquely identifiable profile identification to each profile.

5. The method of processing grammar-based legality expressions of claim 4, wherein the profile is used to create all equivalent indices for atomic expressions and units of evaluation.

6. The method of processing grammar-based legality expressions of claim 5, wherein the profile is stored in a searchable profile table.

7. The method of processing grammar-based legality expressions of claim 2, further comprising:
   selecting atomic expressions that match a context of a retrieval query based upon corresponding profiles of the atomic expressions; and
   evaluating the selected atomic expressions by comparing the units of evaluation to the request context.

8. The method of processing grammar-based legality expressions of claim 7, wherein the indexing step further comprises storing the units of evaluation, the atomic expressions, and processing instructions in a repository with the corresponding profiles.

9. The method of processing grammar-based legality expressions of claim 7, wherein the selecting step further comprises:
   planning queries from input context objects; and
   constructing an initial search domain for the planned queries.

10. The method of processing grammar-based legality expressions of claim 9, wherein the selecting step further comprises executing each planned query to retrieve the set of atomic expressions that satisfy the query request.

11. The method of processing grammar-based legality expressions of claim 10, wherein the selecting step further comprises constructing the units of evaluation from the atomic expressions returned from the query request.

12. The method of processing grammar-based legality expressions of claim 11, wherein the selecting step further comprises validating the results of each executed query against unification rules stipulating whether an atomic expression in a unit of evaluation may be unified with a corresponding atomic expression in the executed query.

13. The method of processing grammar-based legality expressions of claim 12, wherein the selecting step further comprises refining the search domain and executing a modified query if the results of the executed queries fail to meet an established relevancy criterion.

14. The method of processing grammar-based legality expressions of claim 10, wherein executing each planned query to retrieve the set of atomic expressions that satisfy the query request further comprises:
   analyzing variations of the atomic expression from the request context by interchanging positions of components of the atomic expression to determine if permutations of the atomic expression exist that are consistent with semantics of a unit of evaluation; and
   translating the identified permutation of the atomic expression into an atomic expression that matches the request context.

15. The method of processing grammar-based legality expressions of claim 9, wherein planning queries from input context objects further comprises retrieving the profile for each atomic expression in the input context object and using the profiles to construct queries to search for atomic expressions in a repository.

16. The method of processing grammar-based legality expressions of claim 9, wherein executing each query further comprises examining the query to determine if the query contains specific profile identifications for any atomic expressions and retrieving all possible profile identifications for the atomic expression.

17. The method of processing grammar-based legality expressions of claim 1, wherein partitioning the legality expression into units of evaluation further comprises validating the legality expression against a grammar and specification to ensure the legality expression conforms to grammar rules and specifications.

18. The method of processing grammar-based legality expressions of claim 17, wherein the partitioning step further comprises extracting the legality expression from a resource.

19. The method of processing grammar-based legality expression of claim 17, wherein the partitioning step further comprises decrypting the legality expression.

20. The method of processing grammar-based legality expressions of claim 17, wherein the units of evaluation comprise an agreement in a contract.

21. The method of processing grammar-based legality expressions of claim 17, wherein the units of evaluation comprise an evocable business activity.

22. The method of processing grammar-based legality expressions of claim 17, wherein the units of evaluation comprise an evocable operation.

23. The method of processing grammar-based legality expressions of claim 17, wherein the units of evaluation comprise a rule in a policy.

24. The method of processing grammar-based legality expressions of claim 17, wherein the units of evaluation comprise a privilege.

25. The method of processing grammar-based legality expressions of claim 17, wherein the indexing step further comprises identifying the semantic type of each atomic expression within the context of its unit of evaluation.

26. The method of processing grammar-based legality expressions of claim 1, wherein partitioning the legality expressions into units of evaluation further comprises verifying the integrity of the legality expression to ensure the legality expression has not been altered.

27. The method of processing grammar-based legality expressions of claim 1, wherein partitioning the legality expressions into units of evaluation further comprises normalizing the legality expression by converting the legality expression to a form suited for processing.

28. The method of processing grammar-based legality expression of claim 1, wherein the indexing step further comprises identifying semantic types of each atomic expression within the context of its language.

29. The method of processing grammar-based legality expressions of claim 1, wherein the indexing step further comprises associating synonymous names for each atomic expression conforming to a particular profile.

30. The method of processing grammar-based legality expressions of claim 1, wherein the sets of key values further comprise context regarding an intended use for the legality expression.

31. The method of processing grammar-based legality expressions of claim 1, wherein the sets of key values further comprise metadata associated with the legality expression.

32. The method of processing grammar-based legality expressions of claim 31, wherein the metadata associated with the legality expression comprises validity periods for the legality expression.

33. The method of processing grammar-based legality expressions of claim 31, wherein the metadata associated with the legality expression comprises information to categorize the legality expression to limit legality expression search space when processing an evaluation request.

34. The method of processing grammar-based legality expressions of claim 1, wherein the separate search spaces comprise separate database tables.

35. The method of processing grammar-based legality expressions of claim 1, wherein the separate search spaces comprise separate processors.

36. The method of processing grammar-based legality expressions of claim 1, wherein the separate search spaces comprise separate partition structures.

37. The method of processing grammar-based legality expressions of claim 1, wherein the separate search spaces comprise search spaces of different priorities.

38. The method of processing grammar-based legality expressions of claim 37, wherein the different priorities are assigned based upon the number of times that the legality expression is used.

39. A method of processing grammar-based legality expressions that are adapted to be used within a system for enforcing licenses, the method comprising:
   partitioning at least one legality expression into one or more units of evaluation to assess the semantic meaning of the legality expression; and
   indexing at least one of the units of evaluation and the atomic expressions for subsequent retrieval based on the semantic meaning of each unit of evaluation and each atomic expression, the atomic expressions denoting the constituent components of the units of evaluation for storage, retrieval, and evaluation of the legality expressions,
   wherein the indexing step further comprises creating a database table encompassing the atomic expressions associated with frequently queried entities to expedite all queries related to that entity, and associating sets of key values with legality expressions where the sets of key values provide additional information related to the legality expressions.

40. The method of processing grammar-based legality expressions of claim 7, wherein the evaluating step further comprises:
   validating the context of a retrieval query against requirements of an application;
   profiling each atomic expression in the context of a retrieval query;
   retrieving the matching atomic expressions, units of evaluation, and processing instructions from the repository;
   validating the atomic expressions against unification rules;
   validating the units of evaluation against unification rules; and
   resolving conflicts between units of evaluation.

41. The method of processing grammar-based legality expressions of claim 40, wherein the resolving step further comprises applying the application's policies to select preferred units of evaluation from among the units of evaluation that conflict.

42. The method of processing grammar-based legality expressions of claim 40, wherein the resolving step further comprises applying the application's policies to combine conflicting units of evaluation.

43. The method of processing grammar-based legality expressions of claim 40, wherein the evaluating step further comprises caching requests and their corresponding results and pre-computing a set of expected common requests.

44. The method of processing grammar-based legality expressions of claim 43, wherein the caching step further comprises re-running the cached request and pre-computing a set of expected common requests at a pre-determined periodic time.

45. A method of translating grammar-based legality expressions into searchable independent expressions for efficiently processing communication requests for digital content, the method comprising:
   validating a syntax of the legality expression against a grammar and specification to ensure the legality expression conforms to grammar rules and a specification;
   verifying the integrity of the validated legality expression based on an application trust model to preserve privacy and secure usage;
   normalizing the verified legality expression into a form suited for machine processing;
   partitioning the normalized legality expression into units of evaluation to assess the semantic meaning of the normalized legality expression;
   atomizing the units of evaluation into atomic expressions;
   indexing at least one of the units of evaluation and the atomic expressions based on the semantic meanings of each unit of evaluation and each atomic expression; and
   storing the indexed units of evaluation, the atomic expressions, and corresponding processing instructions in a repository,
   wherein after the storing step, the method further comprises constructing a query to locate and access atomic expressions and processing instructions from the repository to match a profile of a desired input context object,
   after the constructing a query step, the method further comprises retrieving atomic expressions matching a profile of the desired input context object,
   after the retrieving step, the method further comprises validating atomic expressions matching a profile of the desired input context object against a predetermined unification rule, and
   the predetermined unification rule evaluates whether an input context object may be used to substitute for a unit of evaluation.

46. The method of claim 45, further comprising:
   profiling the atomic expressions to identify, organize, and manage storage and retrieval of legality expressions, units of evaluation, and atomic expressions that represent an identical object,
   wherein the profile of a legality expression is updated each time a new profile is created in the repository.

47. The method of translating grammar-based legality expressions of claim 46, wherein the organization of the atomic expressions is based on a context in which the legality expression was received.

48. The method of translating grammar-based legality expressions of claim 47, wherein the context in which the legality expression was received comprises at least one of the following: metadata associated with the legality expression, validity periods for the legality expression, and information used to categorize the legality expression to partition search space.

49. The method of translating grammar-based legality expressions of claim 47, wherein the context in which the legality expression was received comprises priority criteria indicating that each legality expression must be stored in a separate search space in the repository based upon the priority criteria.

50. The method of translating grammar-based legality expressions of claim 45, wherein the constructing a query step further comprises constructing an initial search domain based upon the desired input context object.

51. The method of translating grammar-based legality expressions of claim 45, wherein the separate search spaces comprise separate database tables.

52. The method of translating grammar-based legality expressions of claim 45, wherein the separate search spaces comprise separate processors.

53. The method of translating grammar-based legality expressions of claim 45, wherein the separate search spaces comprise separate partition structures.

54. The method of translating grammar-based legality expressions of claim 45, wherein the separate search spaces comprise search spaces of different priorities.

55. A legality expression processing system to process grammar-based legality expressions, the system comprising:
   means for partitioning at least one legality expression into one or more units of evaluation to assess the semantic meaning of the legality expression; and
   means for indexing at least one of the units of evaluation and the atomic expressions for subsequent retrieval based on the semantic meaning of each unit of evaluation and each atomic expression, the atomic expressions denoting the constituent components of the units of evaluation for storage, retrieval, and evaluation of the legality expressions,
   wherein the indexing means further comprises means for assigning legality expressions to separate search spaces based upon predetermined criteria, and means for associating sets of key values with legality expressions where the sets of key values provide additional information related to the legality expressions.

56. The legality expression processing system of claim 55, wherein the separate search spaces comprise separate database tables.

57. The legality expression processing system of claim 55, wherein the separate search spaces comprise separate processors.

58. The legality expression processing system of claim 55, wherein the separate search spaces comprise separate partition structures.

59. The legality expression processing system of claim 55, wherein the separate search spaces comprise search spaces of different priorities.

60. A data storage medium with computer-executable instructions for processing grammar-based legality expressions for enforcing licenses comprising:
   instructions for partitioning at least one legality expression into one or more units of evaluation to assess the semantic meaning of the legality expression; and
   instructions indexing at least one of the units of evaluation and the atomic expressions for subsequent retrieval based on the semantic meaning of each unit of evaluation and each atomic expression, the atomic expressions denoting the constituent components of the units of evaluation for storage, retrieval, and evaluation of the legality expressions, wherein the instructions for indexing further comprise instructions for creating a database table encompassing the atomic expressions associated with frequently queried entities to expedite all queries related to that entity, and instructions for associating sets of key values with legality expressions where the sets of key values provide additional information related to the legality expressions.

61. The data storage medium with computer-executable instructions for processing grammar-based legality expressions for enforcing licenses of claim 60, further comprising instructions for unifying a query context object and an atomic expression by evaluating the atomic expression against the context and resolving conflicts between the atomic expression and the result of the evaluation.

62. The data storage medium with computer-executable instructions for processing grammar-based legality expressions for enforcing licenses of claim 61, further comprising:

instructions for creating profiles representing semantic meanings of the atomic expressions; and instructions for classifying the atomic expressions into the corresponding profiles, the profiles comprising a set of identifications assigned to the atomic expressions.

63. The data storage medium with computer-executable instructions for processing grammar-based legality expressions for enforcing licenses of claim 62, wherein the instructions for classifying further comprise instructions for assigning a uniquely identifiable profile identification to each profile.

64. The data storage medium with computer-executable instructions for processing grammar-based legality expressions for enforcing licenses of claim 63, wherein the profile identification is used to create all equivalent indices for atomic expressions and units of evaluation.

65. The data storage medium with computer-executable instructions for processing grammar-based legality expressions for enforcing licenses of claim 64, wherein the profile is stored in a searchable profile table.

66. The data storage medium with computer-executable instructions for processing grammar-based legality expressions for enforcing licenses of claim 61, further comprising:

instructions for selecting atomic expressions that match a context of a retrieval query based upon corresponding profiles of the atomic expressions; and instructions for evaluating the selected atomic expressions by comparing the units of evaluation to a request context.

67. The data storage medium with computer-executable instructions for processing grammar-based legality expressions for enforcing licenses of claim 66, wherein the instructions for indexing further comprise instructions for storing the units of evaluation, the atomic expressions, and processing instructions in a repository with corresponding profiles.

68. The data storage medium with computer-executable instructions for processing grammar-based legality expressions for enforcing licenses of claim 66, wherein the instructions for selecting further comprise:

instructions for planning queries from input context objects; and instructions for constructing an initial search domain for the planned queries.

69. The data storage medium with computer-executable instructions for processing grammar-based legality expressions for enforcing licenses of claim 68, wherein the instructions for selecting further comprise instructions for executing each planned query to retrieve the set of atomic expressions that satisfy the query request.

70. The data storage medium with computer-executable instructions for processing grammar-based legality expressions for enforcing licenses of claim 69, wherein the instructions for selecting further comprise instructions for constructing the units of evaluation from the atomic expressions returned from the query request.

71. The data storage medium with computer-executable instructions for processing grammar-based legality expressions for enforcing licenses of claim 70, wherein the instructions for selecting further comprise instructions for validating the results of each executed query against unification rules stipulating whether an atomic expression in a unit of evaluation may be unified with a corresponding atomic expression in the executed query.

72. The data storage medium with computer-executable instructions for processing grammar-based legality expressions for enforcing licenses of claim 71, wherein the instructions for selecting further comprise instructions for refining the search domain and for executing a modified query if the results of the executed queries fail to meet an established relevancy criterion.

73. The data storage medium with computer-executable instructions for processing grammar-based legality expressions for enforcing licenses of claim 69, wherein the instructions for executing each planned query to retrieve the set of atomic expressions that satisfy the query request further comprises:

instructions for analyzing variations of the atomic expression from the request context by interchanging positions of components of the atomic expression to determine if permutations of the atomic expression exist that are consistent with semantics of a unit of evaluation; and instructions for translating the identified permutation of the atomic expression into an atomic expression that matches the request context.

74. The data storage medium with computer-executable instructions for processing grammar-based legality expressions for enforcing licenses of claim 68, wherein the instructions for planning queries from input context objects further comprise instructions for retrieving the profile for each atomic expression in the input context object and for using the profiles to construct queries to search for atomic expressions in a repository.

75. The data storage medium with computer-executable instructions for processing grammar-based legality expressions for enforcing licenses of claim 68, wherein the instructions for executing each query further comprise instructions for examining the query to determine if the query contains specific profile identifications for any atomic expressions and retrieving all possible profile identifications for the atomic expression.

76. The data storage medium with computer-executable instructions for processing grammar-based legality expressions for enforcing licenses of claim 66, wherein the instructions for evaluating further comprise:

instructions for validating the context of a retrieval query against requirements of an application;

instructions for profiling each atomic expression in the context of a retrieval query;

instructions for retrieving the matching atomic expressions, units of evaluation, and processing instructions from the repository;

instructions for validating the atomic expressions against unification rules;

instructions for validating the units of evaluation against unification rules; and instructions for resolving conflicts between units of evaluation.

77. The data storage medium with computer-executable instructions for processing grammar-based legality expressions for enforcing licenses of claim 76, wherein the instructions for resolving further comprise instructions for applying the application's policies to select preferred units of evaluation from among the units of evaluation that conflict.

78. The data storage medium with computer-executable instructions for processing grammar-based legality expressions for enforcing licenses of claim 76, wherein the instructions for resolving further comprise instructions for applying the application's policies to combine conflicting units of evaluation.

79. The data storage medium with computer-executable instructions for processing grammar-based legality expressions for enforcing licenses of claim 76, wherein the instructions for evaluating further comprise instructions for caching requests and their corresponding results and for pre-computing a set of expected common requests.

80. The data storage medium with computer-executable instructions for processing grammar-based legality expressions for enforcing licenses of claim 79, wherein the instructions for caching further comprise instructions for re-running the cached request and for pre-computing a set of expected common requests at a pre-determined periodic time.

81. The data storage medium with computer-executable instructions for processing grammar-based legality expressions for enforcing licenses of claim 60, wherein the instructions for partitioning the legality expression into units of evaluation further comprise instructions for validating the legality expression against a grammar and specification to ensure the legality expression conforms to grammar rules and specifications.

82. The data storage medium with computer-executable instructions for processing grammar-based legality expressions for enforcing licenses of claim 81, wherein the instructions for partitioning further comprise instructions for extracting the legality expression from a resource.

83. The data storage medium with computer-executable instructions for processing grammar-based legality expressions for enforcing licenses of claim 81, wherein the instructions for partitioning further comprise instructions for decrypting the legality expression.

84. The data storage medium with computer-executable instructions for processing grammar-based legality expressions for enforcing licenses of claim 81, wherein the units of evaluation comprise an agreement in a contract.

85. The method of processing grammar-based legality expressions of claim 81, wherein the units of evaluation comprise an evocable business activity.

86. The method of processing grammar-based legality expressions of claim 81, wherein the units of evaluation comprise an evocable operation.

87. The method of processing grammar-based legality expressions of claim 81, wherein the units of evaluation comprise a rule in a policy.

88. The method of processing grammar-based legality expressions of claim 81, wherein the units of evaluation comprise a privilege.

89. The data storage medium with computer-executable instructions for processing grammar-based legality expressions for enforcing licenses of claim 81, wherein the instructions for indexing further comprise instructions for identifying the semantic type of each atomic expression within the context of its unit of evaluation.

90. The data storage medium with computer-executable instructions for processing grammar-based legality expressions for enforcing licenses of claim 60, wherein the instructions for partitioning the legality expressions into units of evaluation further comprise instructions for verifying the integrity of the legality expression to ensure the legality expression has not been altered.

91. The data storage medium with computer-executable instructions for processing grammar-based legality expressions for enforcing licenses of claim 60, wherein the instructions for partitioning the legality expressions into units of evaluation further comprise instructions for normalizing the legality expression by converting the verified legality expression to a form suited for processing.

92. The data storage medium with computer-executable instructions for processing grammar-based legality expressions for enforcing licenses of claim 60, wherein the instructions for indexing further comprise instructions for identifying all semantic types of each atomic expression within the context of its language.

93. The data storage medium with computer-executable instructions for processing grammar-based legality expressions for enforcing licenses of claim 60, wherein the instructions for indexing further comprise instructions for associating synonymous names for each atomic expression conforming to a particular profile.

94. The data storage medium with computer-executable instructions for processing grammar-based legality expressions for enforcing licenses of claim 60, wherein the sets of key values further comprise context regarding an intended use for the legality expression.

95. The data storage medium with computer-executable instructions for processing grammar-based legality expressions for enforcing licenses of claim 60, wherein the sets of key values further comprise metadata associated with the legality expression.

96. The data storage medium with computer-executable instructions for processing grammar-based legality expressions for enforcing licenses of claim 95, wherein the metadata associated with the legality expression comprises validity periods for the legality expression.

97. The data storage medium with computer-executable instructions for processing grammar-based legality expressions for enforcing licenses of claim 95, wherein the metadata associated with the legality expression comprises information to categorize the legality expression to limit legality expression search space when processing an evaluation request.

98. The data storage medium with computer-executable instructions for processing grammar-based legality expressions for enforcing licenses of claim 60, wherein the instructions for indexing further comprise instructions for assigning legality expressions to separate search spaces based upon predetermined criteria.

99. The data storage medium with computer-executable instructions for processing grammar-based legality expressions for enforcing licenses of claim 98, wherein the separate search spaces comprise separate database tables.

100. The data storage medium with computer-executable instructions for processing grammar-based legality expres sions for enforcing licenses of claim 98, wherein the separate search spaces comprise separate processors.

101. The data storage medium with computer-executable instructions for processing grammar-based legality expressions for enforcing licenses of claim 98, wherein the separate search spaces comprise separate partition structures.

102. The data storage medium with computer-executable instructions for processing grammar-based legality expressions for enforcing licenses of claim 98, wherein the separate search spaces comprise search spaces of different priorities.

103. The data storage medium with computer-executable instructions for processing grammar-based legality expressions for enforcing licenses of claim 102, wherein the different priorities are assigned based upon the number of times that the legality expression is used.

* * * * *